(12) United States Patent
Sundaram et al.

(10) Patent No.: US 11,691,678 B1
(45) Date of Patent: Jul. 4, 2023

(54) INTERIOR SEALING FOR CARRIAGE STYLE VEHICLE

(71) Applicant: Zoox, Inc., Foster City, CA (US)

(72) Inventors: Goutham Shanmuga Sundaram, Foster City, CA (US); Mikael Jarsaeter, Burlingame, CA (US); Maria Fernanda Villanueva Ochoa, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 159 days.

(21) Appl. No.: 17/390,534

(22) Filed: Jul. 30, 2021

(51) Int. Cl.
*B62D 25/20* (2006.01)
*B62D 31/00* (2006.01)
*G01D 21/00* (2006.01)
*B60J 10/70* (2016.01)
*B60J 10/15* (2016.01)

(52) U.S. Cl.
CPC ............. *B62D 25/20* (2013.01); *B60J 10/15* (2016.02); *B60J 10/70* (2016.02); *B62D 31/00* (2013.01); *G01D 21/00* (2013.01)

(58) Field of Classification Search
CPC ........ B62D 25/20; B62D 31/00; G01D 21/00; B60J 10/20; B60J 10/15
See application file for complete search history.

(56) References Cited

U.S. PATENT DOCUMENTS 11,548,427 B1 * 1/2023 Shanmuga Sundaram ............ B62D 25/20

* cited by examiner

*Primary Examiner* — Dennis H Pedder
*Assistant Examiner* — Melissa Ann Bonifazi
(74) *Attorney, Agent, or Firm* — Lee & Hayes, P.C.

(57) ABSTRACT

A sealing system for a vehicle is configured to separate a vehicle cabin between a dry area and a wet area and to channel a spilled fluid or waste material inside the wet area to a collection area for cleaning. The sealing system may include one or more sealing members that can be extrusion molded to fill one or more gaps between two or more vehicle components.

20 Claims, 29 Drawing Sheets

INTERIOR SEALING FOR CARRIAGE STYLE VEHICLE

BACKGROUND

Vehicle cleanliness is generally desirable and often important for an improved rider experience. This is particularly important for vehicles used for public transportation. During vehicle operation, it may not be always possible to closely control the behavior of passengers and/or prevent spill of fluid or solid waste materials. It may also not be always possible to attend to a spill that occurred in vehicle mid-ride or at the completion of a ride. As such, waste material may be present in a vehicle that could lead to staining, odor, and other unsanitary conditions.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
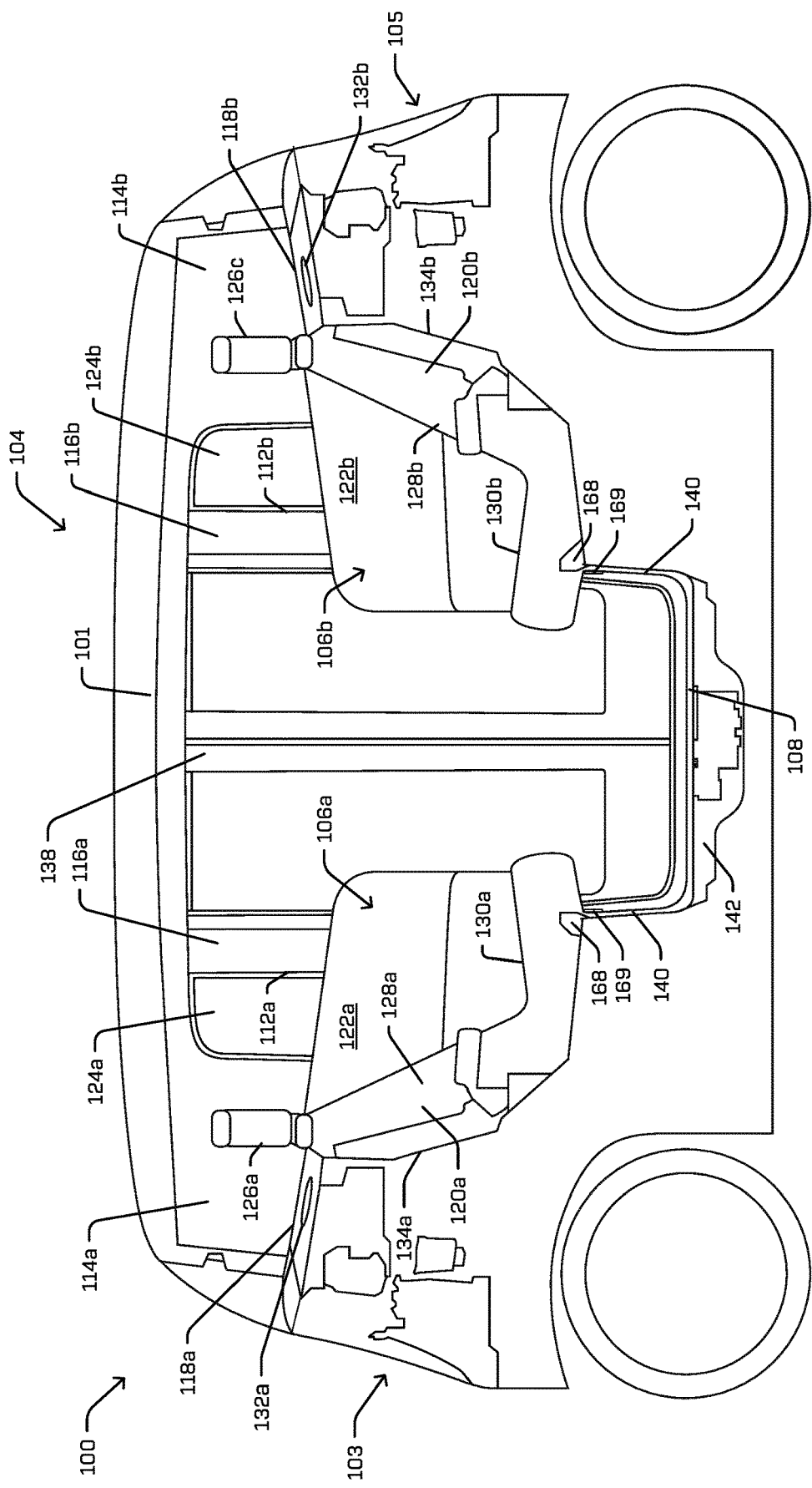
FIG. 1 is a cross-section view of an example of a vehicle in which a sealing system as described may be implemented.

This application relates to an interior sealing system for vehicles configured to seal a first portion of a vehicle cabin from a second portion of the vehicle cabin so that fluid or other waste material spilled in the first portion are prevented from reaching the second portion, and are channeled to one or more collection areas that can be easily serviced. In examples, one or more collection areas may be serviced without requiring removal of any components from the vehicle. In examples, one or more collection areas may be serviced by removing only a floor component and/or a kickplate component as described. The interior sealing system 102 as described may be used in any vehicle. In examples, the vehicle can include an automobile, a bus, a truck, a train, a trolly, a subway train, an airplane, cable car, cabin, a boat or any other vehicle. In examples, the vehicle may be any means of transportation designed to transport one or more passengers. In examples, the vehicle may include one or more seats. In examples, the vehicle may include carriage style seating, in which seats of the vehicle are positioned facing one another. The seats may be positioned at opposite longitudinal ends of the vehicle and facing toward a longitudinal center of the vehicle. In examples, the vehicle may be an autonomous vehicle, a manually operated vehicle, a remotely operated vehicle, or any combination thereof. In examples, the vehicle may be a personal vehicle, a ride-share vehicle, a vehicle of mass transport, or any combination thereof. For purposes of this description, examples of the sealing system will be described in conjunction with an autonomous vehicle including carriage style seating. This, however, is only an illustrative example.

Current waste material management in public vehicles may not be compatible with the desire for rider comfort. For example, existing management approaches include daily or periodic cleaning, including wiping and/or vacuuming of surfaces. In examples, use of industrial strength materials that are more durable and that can endure excessive cleaning may be employed. In examples, public vehicles may include the use of materials that are no absorbent and that can be more easily sterilized. In examples, the vehicle interior for a public vehicle may be simplified to basic structures that can be easily removed, cleaned, and may not contain much if any electronic components or like systems that could be affected by fluid or solid waste material. Although these approaches can be advantageous, they can limit the features that could be implemented to improve rider comfort such as more comfortable or aesthetically pleasing materials, presence of electronic components such as sensors, speakers, lighting, and like components that could improve a rider experience. Also, public vehicles may often only exhibit limited level of cleanliness where dirt, liquid, and other waste material may accumulate at corners or seams. Finally, it may be desirable to provide for a system in which any fluid and/or waste material introduced in the vehicle can be cleaned without requiring removal of one or more vehicle components like seats such as done in standard practice.

In examples, a vehicle is provided including a vehicle cabin having a wet area and a dry area, one or more electrical components located in the dry area, a seating area comprising a first seat and a second seat, wherein the first seat and second seat are arranged facing each other, one or more collection areas comprising a floor collection area disposed between the first seat and the second seat; and a sealing system separating the wet area from the dry area, wherein the sealing system is configured to channel a fluid or waste material in the wet area to the floor collection area and to prevent transition of the fluid or waste material from transitioning from the wet area to the dry area.

In examples, a sealing system is provided in an internal portion of a vehicle having carriage style seating, the sealing system including a first element extending along a seating area of the vehicle, a second element at a longitudinal end of the seating area, a third element at a window of the vehicle, and a collection area located at a floor of the vehicle, wherein the first element, second element, and third element are configured to channel fluid or waste material to the collection area.

In examples, a method is provided for collecting fluid or waste material inside a vehicle. The method includes receiving fluid or waste material in a passenger compartment of the vehicle, channeling, using a sealing system, the fluid or waste material to a collection area located inside the vehicle, and detecting, by a detector of the vehicle, presence of the fluid or waste material in the collection area.

FIG. 1 illustrates an example of a vehicle 100 with a sealing system 102 to seal a first portion of a vehicle cabin from a second portion of the vehicle cabin so that fluid or other waste material spilled in the first portion are prevented from reaching the second portion, and are channeled to one or more collection areas that can be easily serviced by direct access requiring either no removal of vehicle components or removal of only minor components such as floor 108 and/or kickplate 136. In examples, a collection area may include a channel opening that allows expulsion of fluid and/or waste material from the vehicle. In examples, the channel opening can be controlled with a valve and/or remain open. In examples, the sealing system 102 as described, may be employed to provide more flexibility in adding comfort elements and/or electronic components to the inside of the vehicle 100 by reducing or eliminating the need for daily or extensive cleanings and thus increasing the materials suitable for the components of the vehicle 100. In examples, the sealing system 102 as described may be especially applicable in autonomous vehicles where there is no driver or operator available who can identify and/or help clean a spill. In examples, the sealing system 102 as described may provide for an efficient and effective means to maintain the interior of a vehicle clean even in the event of a spill of a liquid or solid waste material. In examples, the sealing system 102 as described may provide for vehicle cleaning without requiring removal of one or more vehicle components such as seats, trim, or other cumbersome structure. In examples, the sealing system 102 as described may provide for a safe containment of electronic components in a dry and/or clean environment. In examples, the sealing system 102 as described may prevent liquid and/or waste material from reaching one or more electronic components of a vehicle. In examples, a vehicle employing a sealing system 102 as described may be equipped with electronics 166 including battery systems, processors, sensors, and other equipment to be stored in the floor, behind the seat, under the seat, or in other locations inside the vehicle in a manner that the electronics are protected at least in part from liquid or grime that may be spilled in or on the vehicle. In examples, the sealing system 102 as described may ease the cleaning of the inside of a vehicle. In examples, the sealing system 102 as described may additionally or alternatively improve noise reduction inside vehicle cabin 104 and thus improve overall rider comfort. In examples, the sealing system 102 as described may provide any one or more of the above alone or in combination.

In examples, a sealing system 102 as described may contain at least in part spills of fluids and solids that may occur inside a vehicle 100 into one or more designated areas. In examples, a fluid and/or waste material spilled inside vehicle 100 may be allowed to reach a sealing system 102 as described. In examples, a sealing system 102 as described may channel spills of fluids and solids that may occur inside a vehicle 100 into one or more designated waste material collection areas. In examples, a collection area may be configured to be easily accessible. In examples, a collection area may be an area configured to be monitored, emptied, cleaned, sanitized, or any combination thereof. In examples, a sealing system 102 as described, may result in at least a portion of the inside of a vehicle clean and dry in between maintenance cleanings of the vehicle. In examples, the sealing system 102 as described, may result in at least a portion of the inside of a vehicle to not require daily cleanings.

In examples, as illustrated in FIG. 1, a vehicle 100 may include a vehicle cabin 104. As described earlier, vehicle 100 may be any vehicle. In examples, vehicle 100 is an autonomous vehicle with carriage style seating. This is only an example. Other examples may include a vehicle with same or different seating arrangements. A vehicle cabin 104 may include a space configured to be accessed by one or more passengers. In examples, vehicle cabin 104 that may include one or more of seating areas 106, a floor 108, one or more door sills 110. In examples, a seating area may include an area that may be occupied by a passenger while seated inside vehicle 100. In examples, a seating area 106 may include one or more seats 120. In examples, a vehicle cabin 104 may be defined by a chassis 101 of vehicle 100. In examples, vehicle cabin 104 may be defined as a space between a first end 103 of vehicle 100, a second end 105 of vehicle 100, and two side portions 107 and 109 of vehicle 100. First and second ends 103 and 105 may include a front and rear of vehicle 100. In examples, vehicle 100 may be a bidirectional vehicle, in which case front and rear of vehicle 100 are interchangeable and may be defined or redefined based on a direction in which vehicle 100 travels. The two side portions 107 and 109 may include the left and right side of vehicle 100. In examples, vehicle 100 may include one or more window trims 112, one or more first pillars 114, one or more second pillars 116, and one or more speaker trays 118. In examples, first and second pillars 114 and 116, along with a window trim 112, may define a window 124. Vehicle 100 may include one or more windows 124a and 124b. In examples, one or more speaker trays 118 may be located inside vehicle cabin 104. In examples, one or more window trims 112 may be located at least in part inside vehicle cabin 104. In examples, one or more first pillars 114 and one or more second pillars 116 may be at a peripheral region of a vehicle cabin 104. In examples, at least a portion of one or more first pillars 114 and at least a portion of one or more second pillars 116 may be located in, or accessible from vehicle cabin 104. In examples, at least a surface of at least a portion of one or more first pillars 114 and at least a surface of at least a portion of one or more second pillars 116 may face into vehicle cabin 104.

Figure 2:
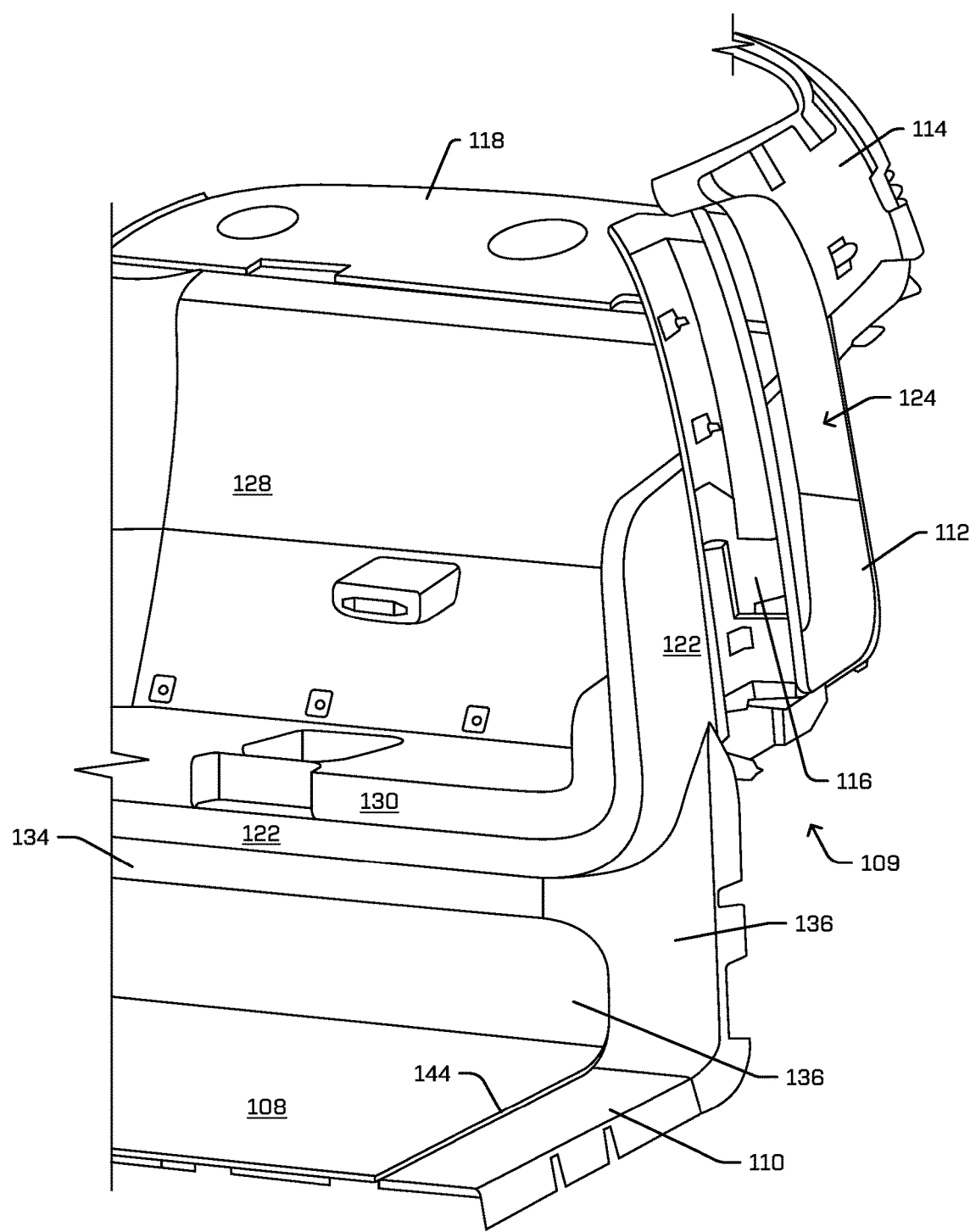
FIG. 2 is a perspective partial view of a vehicle in which a sealing system as described may be implemented.

In examples, a vehicle 100 may include carriage style seating in seating areas 106a and 106b. In examples, carriage style seating refers to two seats 120 arranged to face each other as illustrated by 120a and 120b in FIGS. 1 and 2. In examples, in a carriage style seating, passengers occupying the seats would face each other. FIG. 1 is cross-section view of vehicle 100 from a center axis traversing the length of vehicle 100 from end 103 to end 105, and FIG. 2 is a partial perspective view of vehicle 100. In examples, vehicle 100 may include two seats 120a and 120b arranged carriage style, two speaker trays 118a and 118b, four kickplates 136, four windows 124, shown only two 124a and 124b, on one side of vehicle 100, a floor 108, two vehicle doors 138 (only one shown in FIG. 1 because it is a cross-section view, a second door 138 may be positioned across from the first door 138), and two door sills 110 (only one shown in FIG. 1 because it is a cross-section view, each door sill may be located by door 138). In examples, a first speaker tray 118a may be positioned between a first seat 120a and a first end 103 of vehicle 100. In examples, a second speaker tray 118b may be positioned between a second seat 120b and a second end 105 of vehicle 100. In examples, two windows 124a and 124b are located on each side 107 and 109 of vehicle 100. In examples, each seat 120a and 120b may be positioned between a first window 124 located on one side 107 of vehicle 100 and a second window 124 located on the opposite side 109 of vehicle 100. In examples, the vehicle door 138 may be positioned between two windows 124 on each side 107 and 109 of vehicle 100. In examples, floor 108 may be located between two seats 120 that are arranged carriage style. In examples, a vehicle 100 may include four kickplates 136. In examples, a vehicle 100 may include a kickplate extending from one or more end portions of a seat 120 and floor 108, door sill 110, or both.

In examples, each side 107 or 109 of vehicle 100 may include a first pillar 114a, a window 124a, a second pillar 116a, a door 138, another second pillar 116b, another window 124b, and another first pillar 114b. In examples, these components of each side 107 and 109 may be framed by a chassis 101 of vehicle 100. In examples, sides 107 and 109 are the same or different. In examples, sides 107 and 109 are the same and include the same components.

A seat 120 can be configured to seat one or more passenger. A seat 120 may be configured to seat two or more passengers side-by-side. Seat 120 may include a seat side portion 122 that separates the body of a passenger seated in seat 120 from a window 124 or other portion of vehicle 100. In examples, a seat 120 may include one or more seatback portions 128. In examples, seat 120 may include a bottom seat portion 130. In examples, a seat 120 may include two seat side portions 122. In examples, a seat 120 may include a seat side portion 122 at each seat end. In examples, a seat 120 may include two seat side portions 122 with a seatback portion 128 and seat bottom 130 both located between the two seat side portions 122. In examples, two seat side portions 122 may part of a contiguous structure that extends below seat bottom 130. In examples, two seat side portions 122 may be part of a contiguous structure that extends below and supports seat bottom 130 as for example illustrated in FIG. 2. In examples, seat 120 may include one or more headrests 126. In examples, seat side portion 122 may extend from a portion of seatback 128 to a portion of seat bottom 130. In examples, seat side portion 122 may be configured as a barrier between a passenger seating on seat 120 and at least a portion of a window 124 of vehicle 100. In examples, seat side portion 122 may extend from at least a side portion of seatback 128 proximate to, adjacent to, and/or in contact with one or more headrests 126 to at least a side portion of seat bottom 130 proximate to, adjacent to, and/or in contact with kickplate 136. In examples, seat side portion 122 may be configured to have a sloping profile toward floor 108. In examples, at least a portion of seat side portion 122 may be inclined toward floor 108. In examples, an inclined profile may aid in allowing fluid and/or waste material spilled to reach one or more portions of sealing system 102. In examples, at least a portion of seat side portion 122 may be parallel to and/or overlap at least a portion of a window 124.

Figure 3:
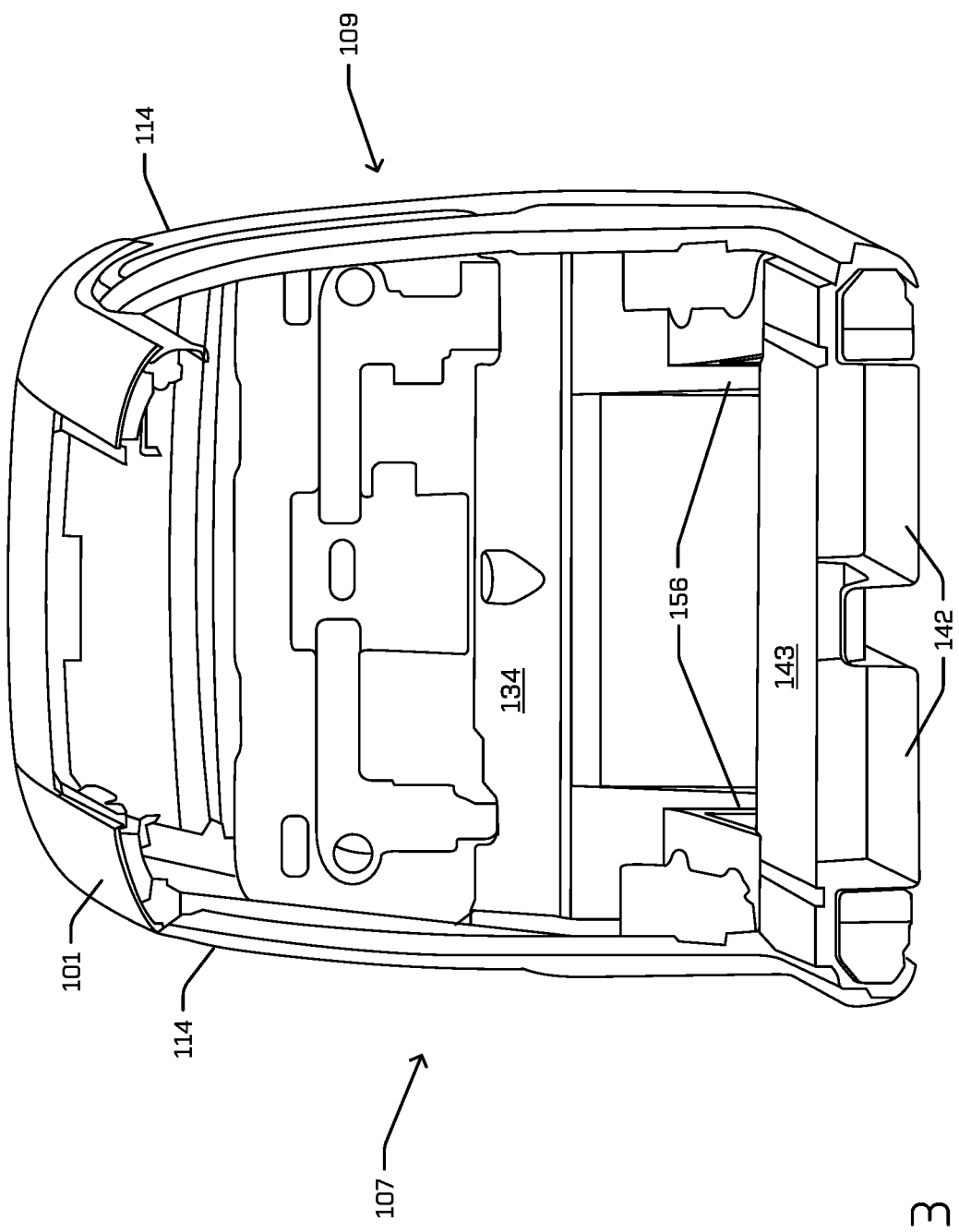
FIG. 3 is a cross-section view of an example of a vehicle with seats removed to illustrate an example bulkhead structure.

Seat 120 and/or any of its components including one or more of seatback 128, seat bottom 130, and one or more seat side portions 122, may be fixed in place by one or more fasteners. In examples, vehicle 100 may include a bulkhead 134 as illustrated in FIG. 3. Shown in FIG. 3 is a cross-section view from a central axis along a width of vehicle 100 extending from a first side 107 to a second side 109, with the seat 120 removed to show the bulkhead 134. In examples, seat 120 and/or any of its components may be fixed in place by fastening it to bulkhead 134. Any suitable fastener may be used. In examples, fasteners can include bolts, screws, clips, brackets, adhesives, clips, or any like fastener and any combination thereof.

As example of a bulkhead 134 with the seat 120 removed is illustrated in FIG. 3. In examples, a bulkhead 134 may be configured to channel fluid and/or other waste material to one or more waste material collection areas such as a trough 156, also referred to herein as a canoe 156. In examples, where vehicle 100 includes more than one seat 120 and/or seating area 106, it should be understood that a bulkhead 134 may be present behind one or more seats 120. In examples, where vehicle 100 include carriage style seating as illustrated in FIG. 1, a bulkhead 134 may be present behind seat 120a and/or seat 120b. In examples, a bulkhead 134 may include one or more grooves and/or one or more surface features on its surface that may be configured to define a flow path to guide fluid and/or waste material along the surface of the bulkhead 134. In examples, a bulkhead 134 may include one or more tubes, tubular structures, and/or channel structures configured to define a flow path to guide fluid and/or waste material across bulkhead 134. In examples, one or more troughs 156 may be located at a bottom portion of a bulkhead 134. In examples, a trough 156 may be located below a portion of a bulkhead 134 onto which a seat 120 may be connected and/or may contact. In examples, trough 156 may be located below a seat bottom 130. In examples, a trough 156 may be covered by one or more of kickplate 136 and floor 108. In examples, a trough 156 may be at least partially covered by at least a portion of floor 108. In examples, a trough 156 may be at least partially covered by at least a portion of floor portion 140. In examples, a trough 156 may be accessed by removing one or more of kickplate 136, and floor 108. In examples, a trough 156 may be easily accessed by removing only kickplate 136 and/or floor 108. In examples, a trough 156 may be accessed without requiring removal of any components of vehicle 100. In examples, a trough 156 may be configured to allow access for cleaning of any fluid and/or other waste material collected therein. In examples, a trough 156 may be configured to be a collection area that may be automatically cleaned as described herein. In examples, a trough 156 may be configured to have an operable valve that may be opened to empty any collected fluid and/or waste material in trough 156. In examples, a trough 156 is separate from space 142 under floor 108. In examples, a trough 156 is configured to maintain any fluids and/or other waste material collected therein from reaching space 142 under floor 108.

Seat 120, and any of its components, may include any suitable material as typically used in automobiles, public transport vehicles, or any passenger type vehicle. In examples, seat 120 may include fabric, plastic, or any combination thereof. In examples, the fabric may include natural fiber, synthetic fiber, or a combination of both. In examples, the fabric may include polyester. In examples, the fabric of seat 120 may be hydrophobic, impermeable, or both. In examples, seat 120 may extend substantially a width of the vehicle 100. In examples, a seat 120, including at least a portion of one or more seat side portions 122, may abut or come in proximity to one or more windows 124 and/or one or more first and second pillars 114 and 116 and one or more window trims 112. In examples, a seat 120 may be positioned between two windows 124 on opposite sides 107 and 109 of a vehicle 100.

Figure 8A:
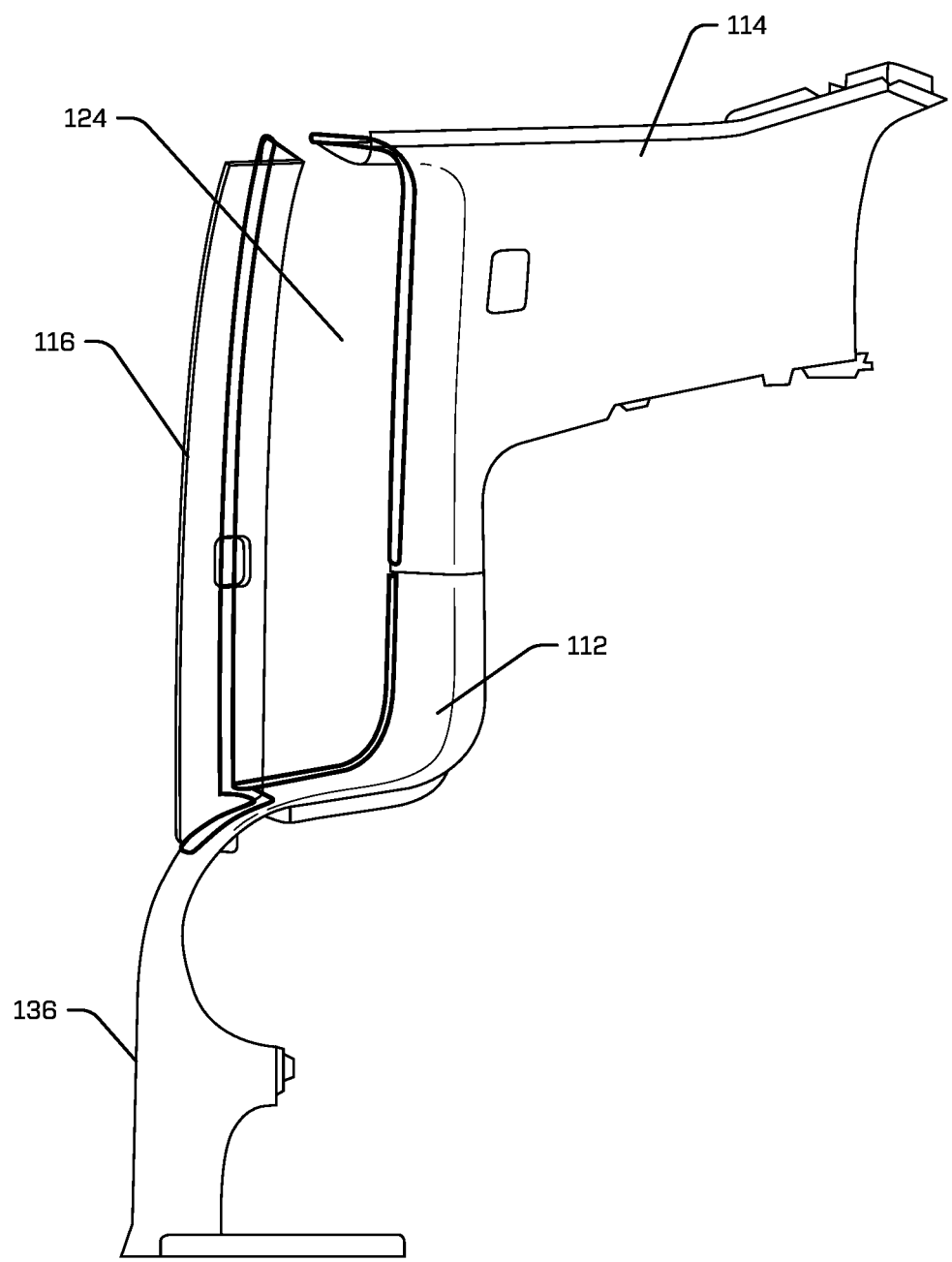
FIGS. 8A to 8L illustrate examples of a vehicle window as may be defined by a first pillar, second pillar and window trim with one or more sealing members and examples of sealing members that may be applied to the window, first pillar, second pillar, and/or window trim.

A window trim 112 may extend along at least a portion of window 124. In examples, a first pillar 114 may extend along at least a portion of window 124. In examples, a second pillar 116 may extend along at least a portion of window 124. In examples, as shown in FIGS. 2 and 8A, window 124 may be defined by a portion of at least window trim 112, first pillar 114, and second pillar 116. In examples, window trim 112, first pillar 114, and second pillar 116 may be configured to define a perimeter of a window 124. In examples, window 124 may include one or more panes such as, for example, glass panes. In examples, window 124 may be operable to open and close. In examples, window 124 may be configured to remained closed and/or sealed.

In examples, as shown in FIGS. 1 and 2, at least a portion of seat side portion 122 of a seat 120 may be located parallel to and next to at least a portion of window 124 and/or one or more first pillar 114, second pillar 116, and window trim 112.

In examples, a speaker tray 118 may be in contact with, and/or located proximate, adjacent to, or close to at least a portion of seat 120. In examples, a speaker tray 118 may extend along at least a longitudinal end of seat 120 and/or seating area 106. In examples, speaker tray 118 may be located between a seat 120 or seating area 106 and an end 103 or 105 of vehicle 100. In examples, speaker tray 118 may be located in contact with, proximate to, adjacent to, or close to one or more headrests 126. In examples, as illustrated in FIGS. 1 and 2, speaker tray 118 may be located in contact with, proximate to, adjacent to, or close an end portion of seatback 128. In examples, speaker tray 118 may be located in contact with, proximate to, adjacent to, or close to an end portion of seatback 128 where one or more headrests 126 may be located.

In examples, speaker tray 118 may be a planar or substantially planar surface. In examples, speaker tray 118 may have a non-planar surface. In examples, speaker tray 118 may have an inclined surface profile. In examples, speaker tray 118 may be inclined or tilted toward floor 108, seat 120, seating area 106, or a combination thereof. In examples, an inclined profile may aid in allowing fluid and/or waste material spilled to reach one or more portions of sealing system 102. In examples, speaker tray 118 may be of any suitable material such as plastic, metal, wood, cardboard, or any combination thereof. In examples, speaker tray 118 may include one or more openings to accommodate one or more speakers 132. In examples, speaker tray 118 may be located proximate to, adjacent to, and/or in contact with one or more headrests 126 and include at least one opening accommodating at least one speaker 132. In examples, speaker tray 118 may be configured as a cover to one or more electronic components 166 such as, for examples, sound electronics, one or more electronic sensors, one or more batteries, electrical cables, one or more breakers, one or more fuses, any other electrical device, or any combination thereof.

In examples, as shown in FIG. 2, a vehicle 100 may include one or more kickplates 136. In examples, a kickplate 136 may be proximate to, adjacent to, and/or in contact with seat 120. In examples, kickplate 136 may be located at an end portion of seat 120. In examples, a vehicle 100 may include four kickplates 136. In examples, a vehicle 100 may include a kickplate extending from one or more seat side portion 122 of a seat 120 and floor 108, door sill 110, or a combination thereof. In examples, kickplate 136 may be in contact with, proximate to, adjacent to, or close to at least a portion of seat bottom 130, seat side portion 122, door sill 110, floor 108, or any combination thereof. In examples, kickplate 136 may extend from a portion of seat bottom 130 to a portion of floor 108. In examples, kickplate 136 may be in contact with, proximate to, adjacent to, or close to at least a portion of door sill 110. In examples, kickplate 136 may be in contact with, proximate to, adjacent to, or close to at least a portion of seat side portion 122, seat bottom 130, at least a portion of floor 108, and at least a portion of door sill 110. In examples, kickplate 136 may be of any suitable resilient material such as plastic, metal, wood, cardboard, or any combination thereof.

In examples, floor 108 may be in contact with, proximate to, adjacent to, or close to a portion of seat 120, seat side portion 122, seat bottom 130, kickplate 136, door sill 110, or any combination thereof. In examples, as illustrated in FIG. 2, a floor 108 may extend from a portion of seat bottom 130 and/or seat side portion 122 of one seat 120*a* to a portion of seat bottom 130 and/or seat side portion 122 of another seat 120*b*. In examples, a floor 108 may extend to a portion of one or more kickplates 136. As illustrated, in examples, a floor 108 may extend to at least a portion of door sill 110.

Figure 4:
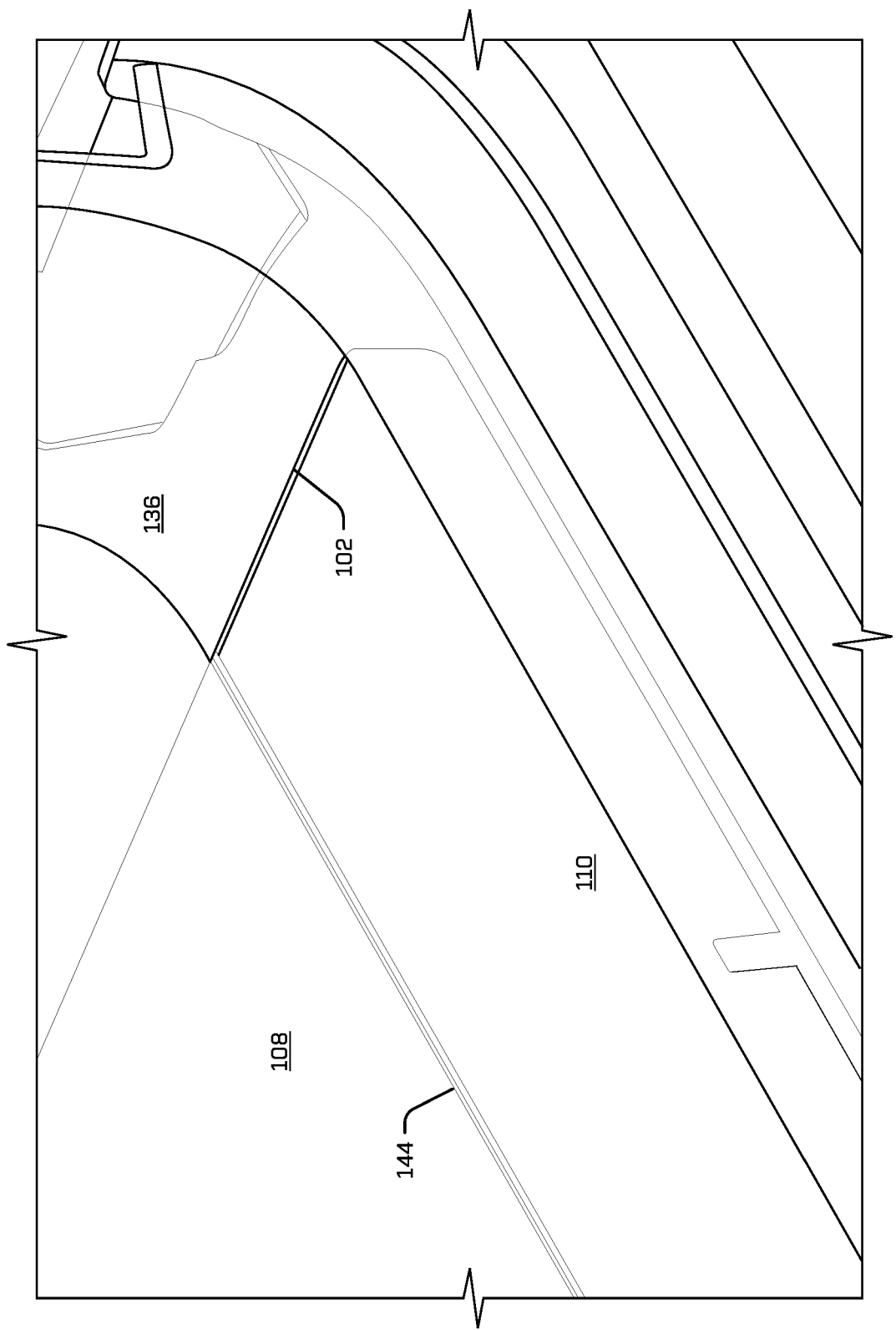
FIG. 4 is a partial view of a vehicle illustrating an example of an interface between a floor, door sill, and kickplate.

In examples, as illustrated in FIGS. 2 to 4, a door sill 110 may be located in contact with, proximate to, adjacent to, or close to at least a portion of floor 108, at least a portion of kickplate 136, or both. In examples, door sill 110 may be located between floor 108 and a portion of vehicle 100 where a door 138 to enter and exit cabin 104 is located. In examples, door sill 110 may extend the span of door 138. In examples, door sill 110 may be located between a first kickplate 136 located by a first seat 120*a* and a second kickplate 136 located by a second seat 120*b*. In examples, door sill 110 may include a plate of suitably resilient material. In examples, door sill 110 may include a metal, metal alloy, plastic, wood, or any combination thereof. In examples, door sill 110 may include aluminum.

Floor 108 may extend from a first seating area 106*a* to a second seating area 106*b*. In examples, floor 108 may extend from a first seat 120*a* to a second seat 120*b*. In examples, floor 108 may extend from a first kickplate 136 that is in contact with, proximate to, adjacent to, or close a portion of a first seat 120*a* to a second kickplate 136 that is in contact with, proximate to, adjacent to, or close a portion of a first seat 120*b*. In examples, floor 108 may extend from a first kickplate 136 that is in contact with, proximate to, adjacent to, or close a portion of a first seat 120*a* to a second kickplate 136 that is also in contact with, proximate to, adjacent to, or close a portion of a first seat 120*a*. In examples, floor 108 may extend from a first seat 120*a* to a second seat 120*b*. In examples, floor 108 may extend from a first bulkhead 134 that is in contact with, proximate to, adjacent to, or close a portion of a first seat 120*a* to a second bulkhead 134 that is also in contact with, proximate to, adjacent to, or close a portion of a first seat 120*b*. As illustrated in FIG. 2, in examples, floor 108 may include a portion 140 that interfaces with and/or overlaps at least a portion of a kickplate 136. In examples, portion 140 of floor 108 may extend to seat 120, seat bottom 130, seat side portion 122 or any combination thereof. In examples, portion 140 of floor 108 may interface and/or at least partially overlap at least a portion of bulkhead 134.

In examples, floor 108 may include a waste material collection area such as floor collection area 146. In examples, floor collection area 146 is at least a portion of a surface of floor 108 where a fluid and/or other waste material spilled in vehicle cabin 104 and/or a wet region of vehicle cabin 104 may be collected. In examples, the floor collection area 146 may be the full upper surface of floor 108. In examples, the floor collection area 146 may be a portion of the upper surface of floor 108. In examples, the floor collection area 146 may be a planar portion of an upper surface of floor 108. In examples, the floor collection area 146 may be horizontal to a bottom portion of chassis 101 of vehicle 100. For purposes of this description the "upper surface of floor 108" refers to the surface of floor 108 upon which a passenger may step when entering and/or riding a vehicle. In examples, floor collection area 146 may be accessed, serviced, and/or cleaned without requiring the removal of any vehicle components. In examples, floor collection area 146 may be accessed, serviced, and/or cleaned by removing floor 108. In examples, removal of only floor 108 may be necessary to service and/or clean floor collection area 146. In examples, the floor collection area 146 may be a common collection area for fluid and/or waste material channeled by a sealing system 102. In examples, where a vehicle 100 may include more than one seating area 106 and/or seats 102, floor collection area 146 may be a common collection area for fluid and/or waste material channeled by sealing system 102 about the two or more seats 102 and/or seating areas 106. For example, where vehicle 100 includes carriage style seating including seats 120a and 120b and/or seating areas 106a and 106b as illustrated in FIG. 1, floor collection area 146 may include a common collection area for fluid and/or waste material channeled about seats 120a and 120b and/or seating areas 106a and 106b. As illustrated in FIG. 1, floor collection area 146 may be part of common floor 108 extending between seats 120a and 120b and/or seating areas 106a and 106b.

In examples, floor 108 may include a false floor as illustrated in FIG. 3. For purposes of this description, the term "false floor" is used to indicate that a space 142 may be provided under floor 108. In examples, space 142 may be defined by a portion 143 of the frame of vehicle 100 and floor 108 may be affixed to frame portion 143. Space 142 may be configured to contain one or more electronic components 166. In examples, space 142 may include one or more electronic components 166 such as one or more electronic sensors, one or more batteries, electrical cables, one or more breakers, one or more fuses, any other electrical device, or any combination thereof. Floor 108 may include an impermeable material. Making floor 108 of an impermeable material can aid in ensuring that no fluid reaches space 142 and thus any of the electronic components 166 located in space 142.

As illustrated in FIGS. 2 and 4, a top surface of floor 108, i.e. the surface over which a passenger may stand can optionally include a floor trim 144. A floor trim 144 may extend along at least one side of floor 108. In examples, the floor trim 144 extends along at least each of two sides of floor 108. In examples, the floor trim 144 may define at least a portion of a floor collection area 146 of floor 108. In examples, the floor trim 144 may be a contiguous trim. In examples, they floor trim 144 may include two or more sections. In examples, floor trim 144 may extend in a vertical direction from a surface of floor 108 to a distance of about 15 mm to 20 mm. In examples, the floor trim 144 may be formed by one or more sealing members 152 as described in more details later. In examples, the floor trim 144 may optionally be formed by an inner portion of floor 108, for example a floor collection area 146, having a surface that is sunk-in or at a different height than the surface of floor 108 at a peripheral area. In examples, the floor trim 144 may be configured to resist fluid or other waste material collected in the floor collection area 146 at a top surface of floor 108 from transferring to other areas of the vehicle. In examples, floor trim 144 may be configured to contain fluid or other waste material within the floor collection area 146 defined at least in part by floor trim 144. In examples, door sill 110 may include one or more floor trims 144 in addition to or in place of floor 108 including a floor trim 144. In examples, floor trim 144 may be included and/or integrated in both floor 108 and in door sill 110. In examples, floor trim 144 may be an independent structure configured to form the seal in conjunction with and/or in place of floor trim 144 provided on floor 108 and/or door sill 110. In examples, floor trim 144 may be configured as an independent structure that may be installed after floor 108 and door sill 110 have been installed.

A sealing system 102 may be disposed to seal one or more areas of a vehicle. For purposes of this disclosure, "seal" as used to describe the sealing system 102 should be understood to mean that the sealing system 102 is able to close a gap or space between structures so that fluid and/or waste material is prevented partially or fully from passing and/or seeping through the gap or space, and instead remain on a surface of the seal body and/or travel along a surface of the seal. In examples, the sealing system 102 may be configured to seal the internal portion of a vehicle intended for passenger occupancy from one or more other internal and/or external areas of the vehicle. In examples, the sealing system 102 may provide a barrier that may prevent fluid and/or other waste material from traveling from a first portion of the inside of the vehicle to a second portion of the inside and/or outside of the vehicle.

For purposes of the present descriptions, in examples, a first portion of the inner vehicle where fluids and/or other waste material may be contained may be referred to herein as "wet area" and a second portion of the inner vehicle from which fluids and/or other waste material, including solid materials, are kept fully or partially may be referred to as "dry area."

In examples, a sealing system 102 may be configured to separate one or more wet areas and one or more dry areas. In examples, a sealing system 102 may provide a barrier separating one or more wet areas and one or more dry areas. In examples, a sealing system 102 may provide a barrier against transfer of at least a portion of fluid and/or waste material from a wet area to a dry area. In examples, sealing system 102 may be configured to channel a fluid and/or waste material in one or more wet areas to one or more collection areas. As described herein one or more collection areas may include one or more floor collection areas, one or more troughs, or any combination thereof. In examples, a sealing system 102 may maintain fluid and/or waste material in one or more designated wet areas of a vehicle, and channel fluid and/or waste material to one or more designated collection areas from which the fluid and/or waste material may be removed.

Figure 5A:
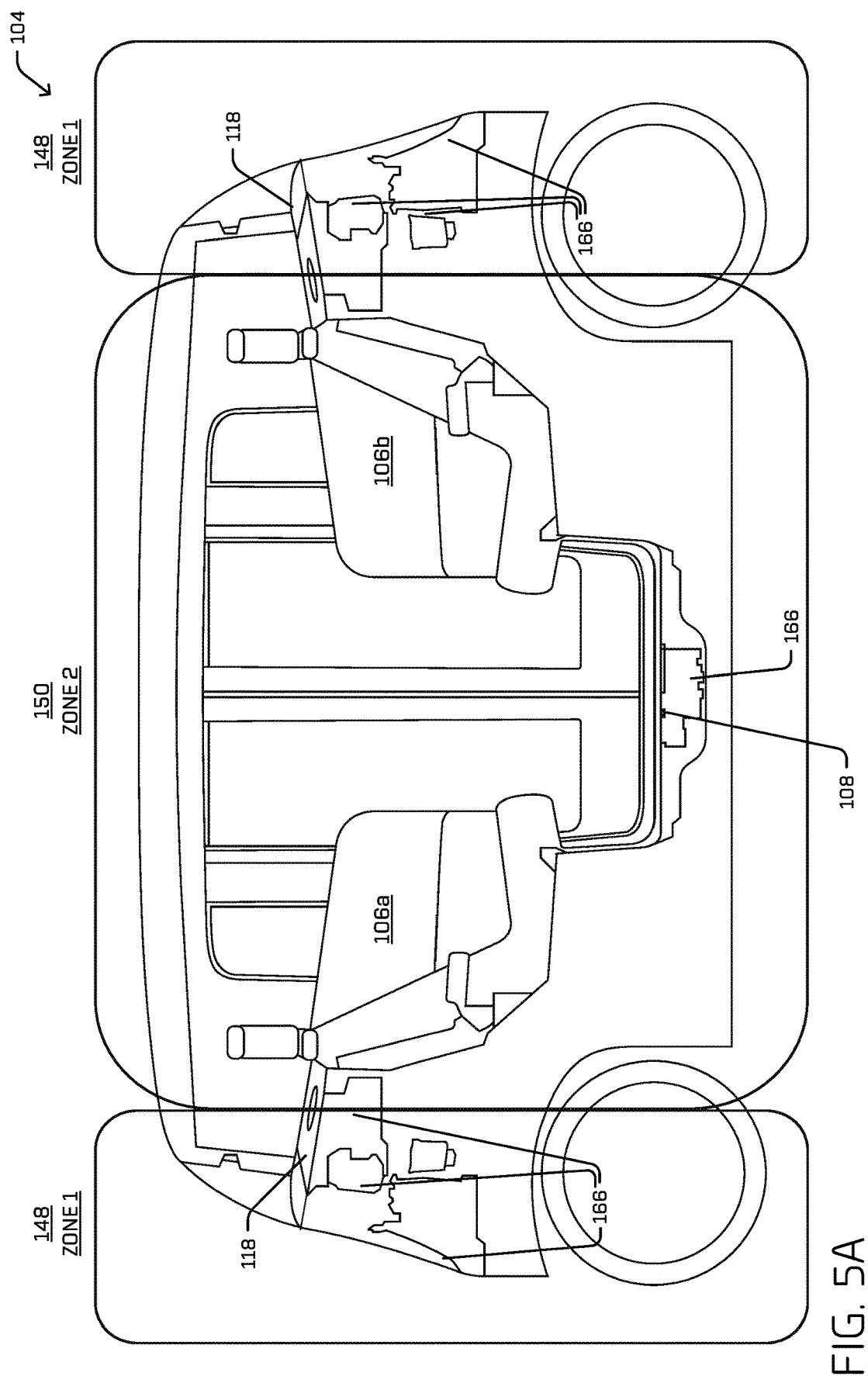
FIG. 5A illustrates an example of a vehicle cabin divided into zones.

FIG. 5A illustrates a vehicle cabin 104 separated into zones. The illustrated vehicle cabin 104 is only an example. Illustrated, the vehicle cabin 104 may include carriage style seating with seats 120a and 120b. In examples, each zone extends the height of the cabin 104, i.e. from a roof portion of vehicle 100, to the portion of the chassis of vehicle 100 that include floor 108 along with space 142. In examples, a first zone 148 may define a space between seat 120 and an end portion 103 or 105 of vehicle 100. As illustrated, in a carriage style vehicle, a first zone 148a may be found between seat 120a and a first end of vehicle 100, and first zone 148b may be found between seat 120b and a second end of vehicle 100. In examples, the boundary of the first zone at seat 120 may be determined by the location of the headrest 126. A second zone 150 may be the area on the opposite side of seat 120 and/or headrest 126 from where the first zone 148 is located.

In examples, one or more electronic components 166, including speakers, may be provided in the first zone 148 below speaker tray 118, i.e. in a dry area of first zone 148. In examples, the risk of fluid spill or waste material spill in the first zone 148 above speaker tray 118, i.e. a wet area of first zone 148, may be lower than the risk of spill in the wet area of second zone 150. In examples, a sealing system 102 as described may be configured to extend to the first zone 148. In examples, the sealing system 102 may be configured to channel fluid and/or other waste material spill in the wet areas of first zones 148 above speaker tray 118 to floor collection area 146 of floor 108. In examples, the sealing system 102 may be configured to channel fluid and/or other waste material spilled in the wet areas of the first zones 148 above speaker tray 118 to a trough 156. In examples, the sealing system 102 may be configured to channel fluid and/or waste material spilled in the wet areas of first zones 148 above speaker tray 118 to floor collection area 146, trough 156, or both.

In examples, the second zone 150 may include an area that may be occupied by a passenger of vehicle 100. In examples, the area in second zone 150 coextensive and/or above a top surface of floor 108 may be a wet area. In examples, the area in second zone 150 below a top surface of floor 108 may be a dry area. In examples, the risk of fluid spill or waste material spill in the wet area of the second zone 150 may be higher than the risk of spill in the wet area of the first zone 148. In examples, a sealing system 102 as described may be configured to extend to the second zone 150. In examples, the sealing system 102 may be configured to channel fluid and/or other waste material spilled in the wet areas of the second zone 150 to floor collection area 146 of floor 108. In examples, the sealing system 102 may be configured to channel fluid and/or other waste material spilled in the wet areas of the second zone 150 to a trough 156. In examples, the sealing system 102 may be configured to channel fluid and/or waste material spilled in the wet areas in the second zone 150 to floor collection area 146, trough 156, or both.

In examples, the sealing system 102 of vehicle 100 can be configured to channel all fluid and/or waste material spilled in the wet areas of first zone 148 to floor collection area 146, and all fluid and/or waste material spilled in the wet areas of second zone 150 to floor collection area 146, trough 156, or a combination of both. In examples, the sealing system 102 of vehicle 100 can be configured to channel at least part of the fluid and/or waste material spilled in the wet areas of first zone 148 to floor collection area 146, and at least part of the fluid and/or waste material spilled in the wet areas of the second zone 150 to floor collection area 146, trough 156, or a combination of both. In examples, the sealing system 102 of vehicle 100 can be configured to impede, prevent, or minimize any transfer of fluid and/or waste material to a dry area in the first zones 148, such as below speaker tray 118, and/or second zone 150 such as in the under floor space 142.

In examples, by locating one or more electronic components 166 in the dry areas of first zones 148 and/or second zone 150 of vehicle 100, it may be possible to reduce, minimize, or eliminate the possibility that a fluid and/or waste material spilled will reach them. Keeping one or more electronic components 166 dry can be a vehicle safety issue. As such, implementing a sealing system 102 to help prevent one or more electronic components 166 from coming into contact with a fluid and/or waste material can improve safety in the vehicle 100.

The sealing system 102 may extent to any one or more of the seating area, floor, door sill, window trim, first pillar, second pillar, and speaker tray. In examples, the sealing system 102 may define one or more discrete wet area and dry areas inside the vehicle cabin 104. In examples, the sealing system 102 may define a main wet area inside the vehicle cabin 104 and one or more dry areas inside the vehicle cabin. In examples, a wet area inside vehicle cabin 104 may be an area that is on one side of sealing system 102. In examples, a dry area may be an area of vehicle 100 that is an opposite side of sealing system 102 from the wet area. In examples, an area of vehicle cabin 104 that is above sealing system 102 may be the wet area. In examples, an area of vehicle 100 that is below sealing system 102 may be the dry area. In examples, dry areas may be configured to house one or more electronic components 166.

In examples, the sealing system 102 may extent to only the seating area. In examples, the sealing system 102 may extent only to the floor. In examples, the sealing system 102 may extend only to the window trim. In examples, the sealing system 102 may extend only to the door sill. In examples, the sealing system 102 may extend only to the first pillar. In examples, the sealing system 102 may extend along a perimeter of a window. In examples, the sealing system 102 may extend only to the second pillar. In examples, the sealing system 102 may extend only to the speaker tray. In examples, the sealing system 102 may extend to a longitudinal end of a seat 120 or seating area 106. In examples, the sealing system 102 may extend to two or more of the above stated portions of the vehicle. In examples, the sealing system 102 may extend to three or more of the above state portions of the vehicle. In examples, the sealing system 102 may extend to four or more or more of the above stated portions of the vehicle. In examples, the sealing system 102 may extend to five or more of the above stated portions of the vehicle. In examples, the sealing system 102 may extend to six or more of the above stated portions of the vehicle. In examples, the sealing system 102 may extend across all of the above stated portions of the vehicle. In examples, the sealing system 102 may extend to a portion of the vehicle 100 that is beyond one or more of the above stated portions of the vehicle.

The sealing system 102 may include one or more structures or bodies. In examples, a vehicle may include a sealing system 102 having one continuous structure that extends to one or more portions of the vehicle to define one or more wet areas and one or more dry areas. In examples, a vehicle may include a sealing system 102 having two or more structures that in combination define one or more wet areas and one or more dry areas.

The sealing system 102 may include any suitable material. In example, the sealing system 102 may include a sealing material, i.e. a material that is able to form a fluid barrier, solid material barrier, or a combination of both. In examples, the sealing system 102 may include one or more flexible materials. In examples, the sealing system 102 may include a rubber material. In examples, the sealing system 102 may include a hydrophobic material. In examples, the sealing system 102 may include a synthetic rubber material. In examples, the sealing system 102 may include Ethylene Propylene Diene Monomer (EPDM). In examples, the sealing system 102 may include one or more foam materials. In examples, the sealing system 102 may include a foam deposited in a two-shot process. In examples, the sealing system 102 may include materials such as polyvinyl chloride (PVC), a thermoplastic vulcanizate material (TPV or PTEV), one or more closed cell foams or any combination thereof. In examples, the sealing system 102 may include a rubber, a treated rubber, and/or a rubber containing polymer solution. Other materials with same or similar flexible properties and capable of forming a barrier to fluid and/or solid material waste may be employed. In examples, the material used for a sealing system 102 is non-absorbent, durable, pliable, or any combination thereof. In examples, the sealing system 102 may include one or more structures of extruded material.

Figure 5B:
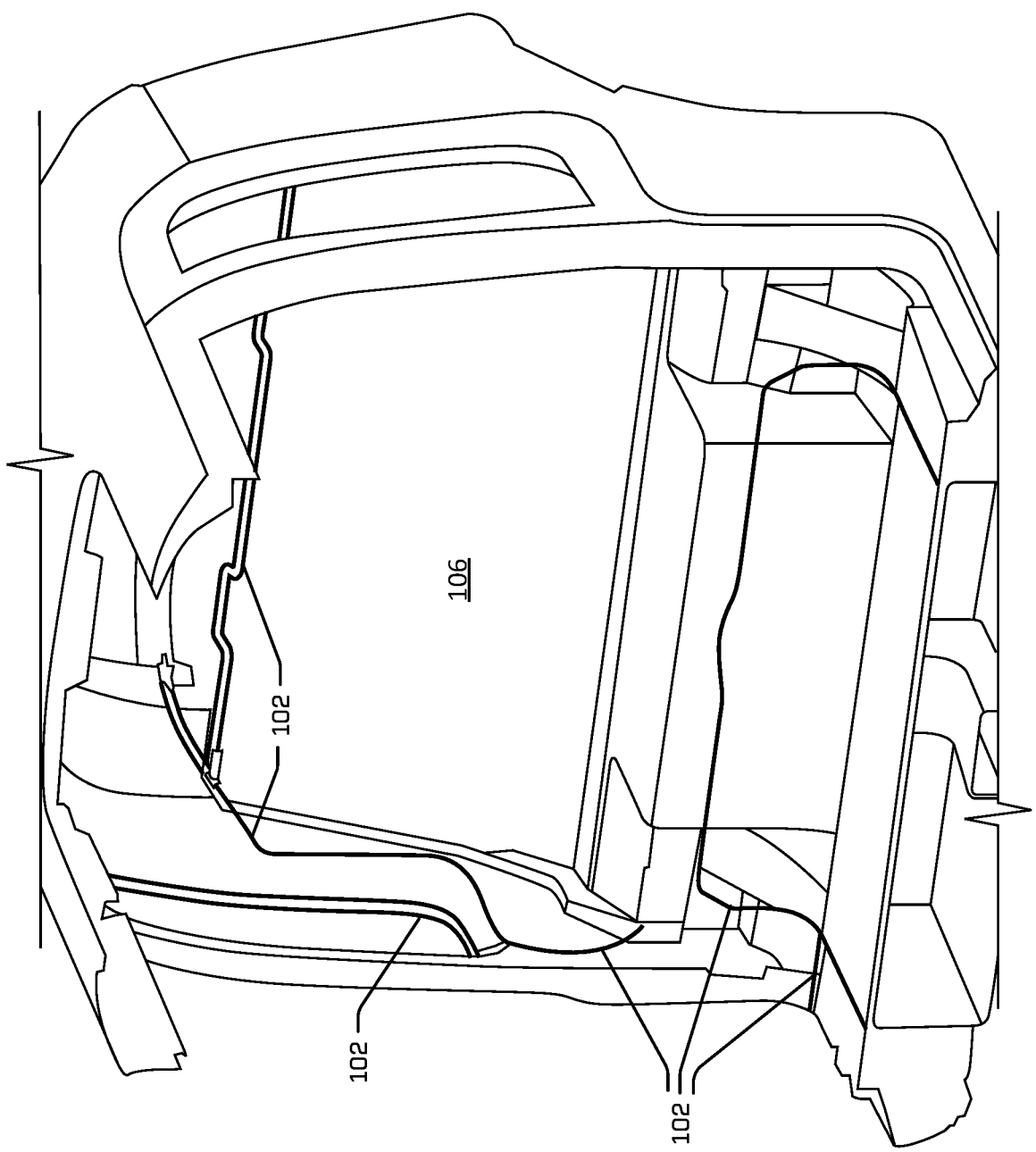
FIGS. 5B and 5C illustrate examples of a sealing system structure as described herein.

In examples, sealing system 102 may be implemented by applying sealing material to one or more components inside vehicle 100, as illustrated in FIG. 5B. The illustration is only an example and sealing system 102 may be extended to further provide a seal between additional components of a vehicle 100. Also, the illustration of FIG. 5B shows a sealing system 102 on one side of seating area 106, however, it should be understood that sealing system 102 may be provide on either or both sides of seating area 106 and/or seat 120 as, for example, illustrated in FIG. 11. In examples, sealing system 102 is provided to extend along both sides of seating area 106 and/or seat 120. In examples, sealing system 102 may be configured to form a channeling structure. In examples, sealing system 102 may be configured as a channel structure able to route fluid and/or other waste material to a predetermined area. In examples sealing system 102 may extend to first zone 148, second zone 150, or both. As illustrated, sealing system 102 may define a contiguous path through one or more portions of vehicle 100 for fluid and/or waste material to follow to a collection area.

Sealing system 102 may include a set of separately installed members 152. In examples, separately installed members 152 may be configured to function as one system. In examples, a member 152 may be formed by extrusion molding. In examples, a member 152 may be formed by a two-shot extrusion molding. In examples, a member 152 may be installed by injecting a first material on a vehicle component. In examples, a member 152 may be extruded and then installed by attaching it to a vehicle component. Any suitable attachment means may be used. In examples, attachment means to connect a member 152 to a vehicle component include adhesive, pins, bolts, tapes, or any combination thereof. In examples, a member 152 may be formed by extruding a second layer material onto the first base material that has been extruded. In examples, the first extruded material and second extruded material of a member 152 are the same or different. In examples, the second extruded material has high pliability than the first extruded material.

Figure 5C:
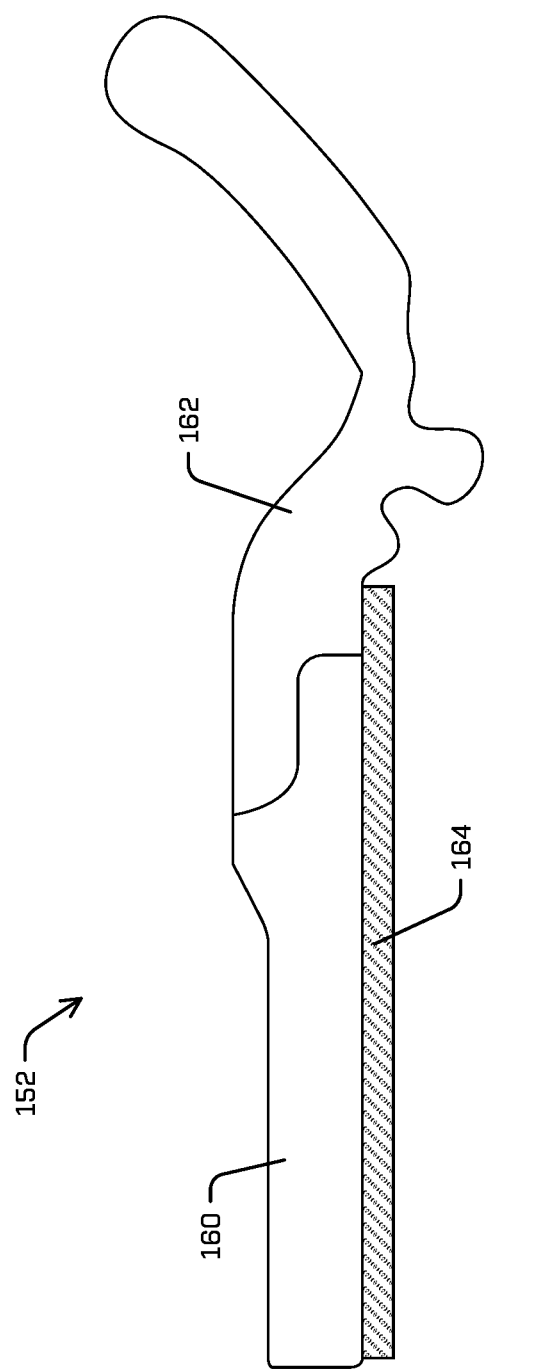

FIG. 5C shows an example cross-section of a member 152. This is simply exemplary. As illustrated, member 152 may include a first extruded base component 160, a second layer 162 extruded over the first base 160. In examples, as shown, member 152 may include one or more attachment means such as a layer of one or more adhesives 164.

The size, shape, and cross-sectional geometry of a member 152 of sealing system 102 are not particularly limited. In examples, the overall size and shape of a member 152 may be dependent on the part on which it is to be installed. For example, as shown, sealing members 152 may be flat, curved, have various lengths, have oblong shapes, have irregular shapes. In examples, as illustrated in conjunction with the discussion that follows, one or more sealing members 152 of sealing system 102 may include one or more cross-sectional geometries. In examples, one or more members 152 of sealing system 102 may have a rectangular cross-section geometry. In examples, one or more members 152 of sealing system 102 may have cross-section geometry that defines a channel such as a U-channel, C-channel, or like structure. In examples, for example as illustrated in FIG. 5C, using a two-shot extrusion process, a first rectangular cross-section geometry may be formed during a first shot extrusion of base 160 and a channel like cross-section geometry may be formed during a second shot extrusion of second layer 162. In examples, any two proximate, adjacent, or contacting members 152 of sealing system 102 may be connected directly or by way of one or more connectors 158. In examples, two or more members 152 are in direct, physical contact. In examples, one or more connectors 158 connect two or more members 152. The shape and size of a connector 158 is not limited. In examples, a connector 158 is configured to channel fluid and/or waste material from a first member 152 to at least a second member 152 that is connected by the connector 158. In examples, one or more connectors 158 may be formed of the same or different materials as members 152. In examples, one or more connectors 158 may be formed and/or installed in the same manner as described for members 152. Examples of members 152 and connectors 158 are illustrated in conjunction with the discussion of FIGS. 6A-10B that follows. These are only examples, other geometries and shapes for members 152 and connectors 158 may also be implemented.

In examples, the transit and/or channeling of fluid and/or waste material along sealing system 102 may be promoted by any available force that can act on the fluid and/or waste material. In examples, the channeling may be promoted or aided by gravity, vibration, ultrasound, motion of the vehicle, or any combination thereof. In examples, one or more aids such as vibration and ultrasound may be applied to vehicle 100 as a whole and/or to one or more portions of sealing system 102. In examples, application of vibration and/or ultrasound may be performed during vehicle operation. In examples, application of vibration and/or ultrasound may be performed between vehicle operations. In examples, vibration, shaking, and/or tilting of a vehicle 100 to promote flow of fluid and/or waste material toward one or more collection areas may be caused by a suspension system of vehicle 100. In examples, one or more sensors in vehicle 100 may detect the presence of fluid and/or waste material in a location of the vehicle 100 and may trigger a signal to operate the suspension of vehicle 100 to induce movement that can promote flow of fluid and/or waste material. In examples, the suspension can create a shaking motion or vibrating motion of the vehicle 100. In examples, the suspension system controls 1326 can cause a wheel suspension of vehicle 100 to tilt vehicle 100 in one direction. In examples, promoting flow of fluid and/or waste material can be performed to aid transfer of fluid and/or waste material into a collection are. In examples, promoting flow of fluid and/or waste material can be performed to aid in expelling fluid and/or waste material from vehicle 100. In examples, vibration and/or ultrasound may be applied to a vehicle 100 and/or at least a portion of sealing system 102 to promote flow of fluid and/or waste material toward one or more collection areas as described herein in advance of cleaning the one or more collection areas. Cleaning and/or draining of a collection area may be done automatically, as described herein, or manually.

FIGS. 6A to 10C illustrate examples of vehicle components onto which one or more members 152 of a sealing system 102 may be installed. The illustrations and accompanying description are only examples. Other components of vehicle 102 may also be equipped with one or more members 152 and the components shown may include more or fewer members 152. In examples, sealing system 102 and/or any subcomponent thereof may be configured to flow fluid and/or waste material toward a collection area.

Figure 6A:
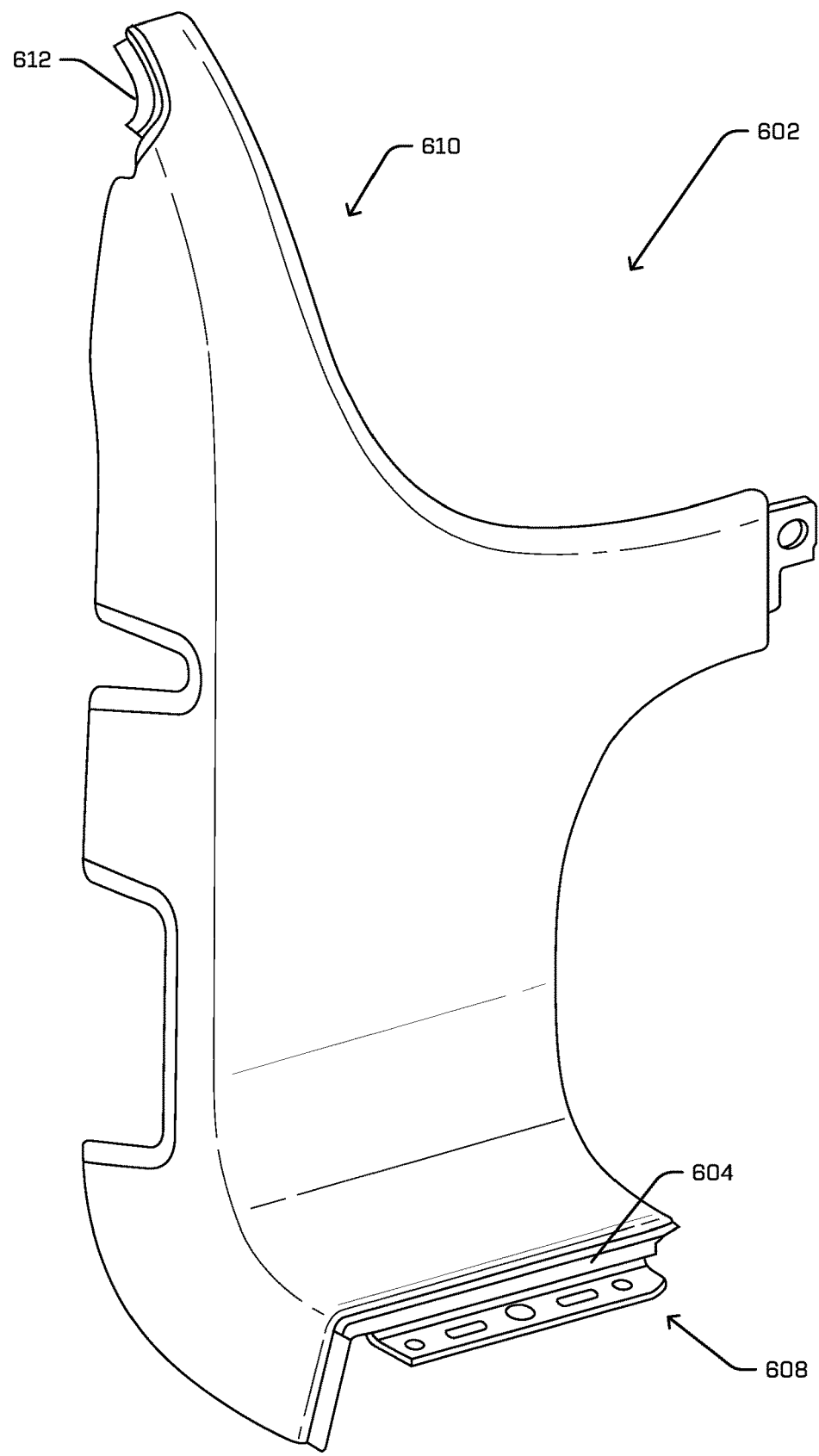
FIGS. 6A to 6C illustrate examples of a kickplate with one or more sealing members and examples of sealing members that may be applied to the kickplate.

FIG. 6A illustrates examples in which one or more members 152 of sealing system 102 may be provided along at least a portion of kickplate 136. As described earlier, in examples, one or more kickplates 136 may extend from a seat 120 and/or seat bottom 130 to floor 108. FIG. 6A illustrates examples of a kickplate 602 located at a portion between seat 120 and a floor 108. In examples, kickplate 602 may reach door sill 110. In examples, one or more kickplate sealing members 604 may be located along at least a portion of kickplate 602. In examples, one or more kickplate sealing members 604 may be located along at least two or more different portions of kickplate 602.

Figure 6C:
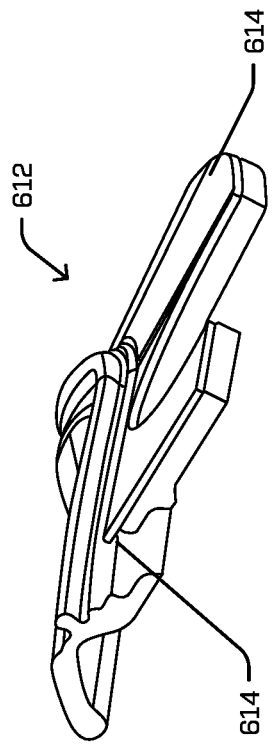
Figure 6B:
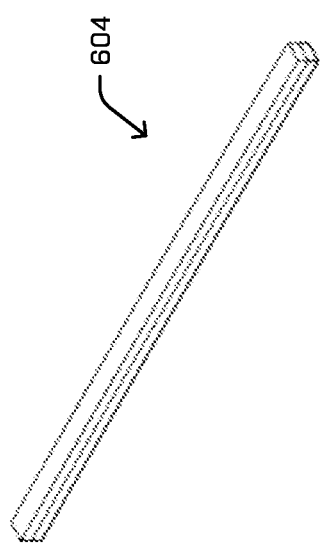

In examples, as shown in FIG. 6B, a kickplate sealing member 604 may include a generally straight structure with a rectangular cross-section. Other shapes and geometries may be implemented. In examples, as illustrated, kickplate sealing member 604 may extend the width of the portion of kickplate 602 that interfaces with door sill 110. In examples, kickplate 602 may reach a portion of window trim 112. In examples, one or more kickplate sealing members 604 may be provide at a portion 606 of kickplate 602 that is at an interface between kickplate 602 and window trim 112, second pillar 116, and/or seat side portion 122. In examples, one or more kickplate sealing members 604 may be provided at a portion 608 of kickplate 602 that is at an interface between kickplate 602 and floor 108. In examples, one or more kickplate sealing members 604 may be provided at a portion 610 of kickplate 602 that is at an interface between kickplate 602 and seat 120 and/or seat bottom 130. In examples, one or more kickplate sealing members 604 are provided on a portion of kickplate 602 and configured to channel fluid and/or waste material to floor collection area 146, trough 156, one or more floor sealing members 704, or any combination thereof. In examples, one or more kickplate sealing members 604 are configured to channel fluid and/or waste material from one or more of window 124, speaker tray 118, seat 120, and seat side portion 122, to floor collection area 146, trough 156, one or more floor sealing members 704, or any combination thereof.

In examples, one or more connectors 158 may be employed to connect kickplate sealing member 604 to one or more other sealing members 152 of sealing system 102. In examples, as illustrated in FIG. 6C, a kickplate to second pillar connector 612 may be configured to connect a kickplate sealing member 604 to a second pillar sealing member and/or to seal a gap at an interface between at least a portion of kickplate 602 and at least a portion of second pillar 116. In examples, a kickplate to second pillar connector 612 may be configured to flow fluid and/or waste material from second pillar sealing member to kickplate 602. In examples, kickplate to second pillar connector 612 may be configured to channel flow of fluid and/or waste material from a second pillar sealing member to kickplate 602. As illustrated, kickplate to second pillar connector 612 may include one or more channels 614 on its surface. In examples, channels 614 may aid in the transit of fluid and/or waste material from one sealing member to the next. In examples, fluid and/or waste material channeled to kickplate 602 may travel down the surface of kickplate 602 and reach one or more kickplate sealing members 604. In examples, one or more kickplate sealing members 604 may be configured to channel and/or deviate flow of fluid and/or waste material toward floor 108, floor collection area 146, or both. In examples, one or kickplate sealing members 604 are configured to as an obstacle and/or barrier to interfere with flow of fluid and/or waste material to door sill 110.

Figure 7A:
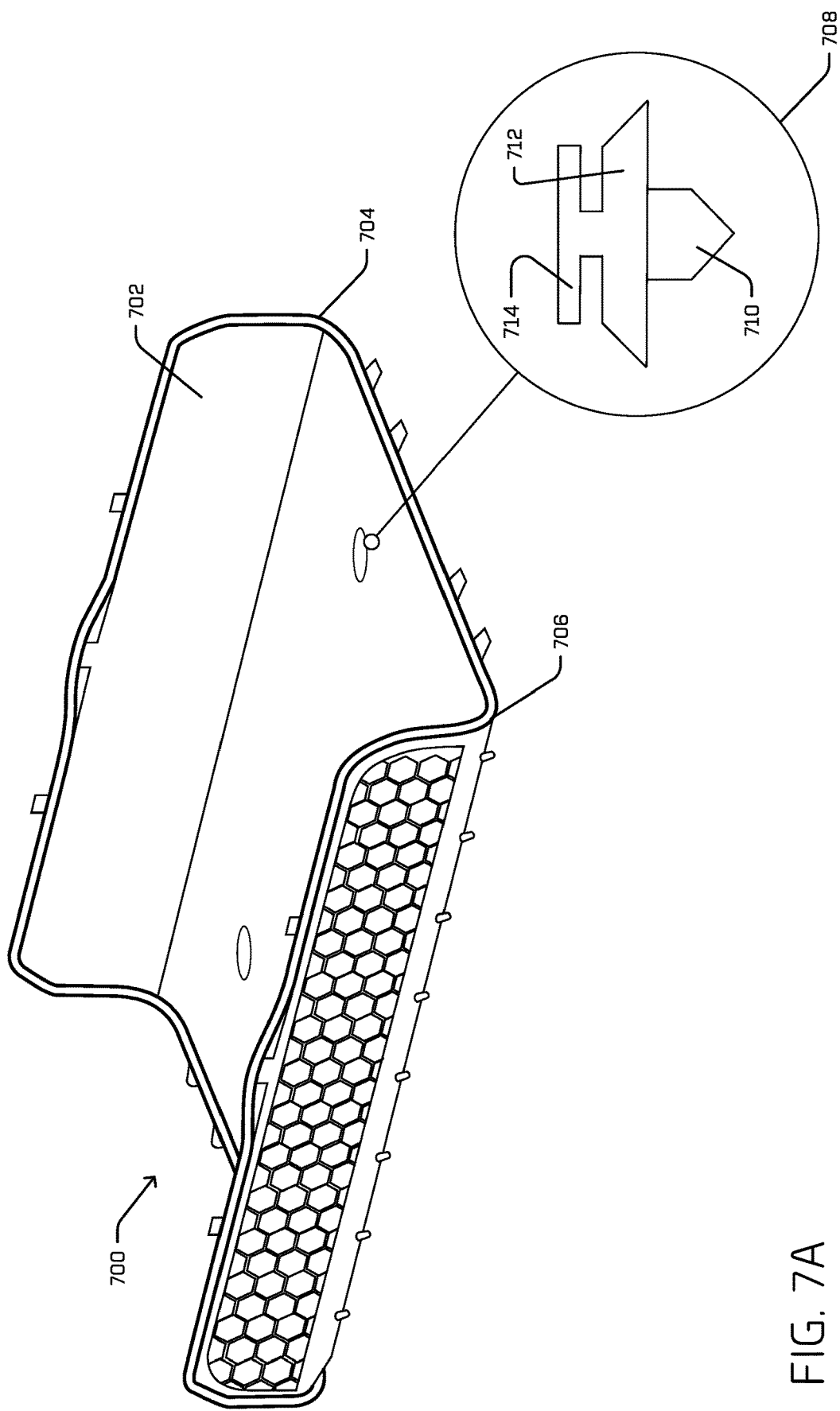
FIGS. 7A to 7C illustrate examples of a floor with one or more sealing members and examples of sealing members that may be applied to the floor.

In examples, a portion of sealing system 102 may be provided at floor 108 to channel fluid and/or waste material to a floor collection area 146. In examples, a portion of sealing system 102 may be provided at floor 108 to prevent, at least in part, fluid and/or waste material collected in floor collection area 146 from transitioning to one or more other areas of vehicle 100. FIG. 7A illustrate at least a portion of floor 108 of a vehicle 100. As described earlier, vehicle 100 may include a hollow or false floor. In examples, floor 108 illustrated as 700 in FIG. 7A may be the portion of vehicle 100 that may overlie a hollow space 142 defined by vehicle frame portion 143 as previously described. Also as described earlier, floor 700 may include one or more portions 702 configured to at least partially overlap and/or interface with at least a portion of one or more of kickplate 136, seat 120, seat bottom 130, seat side portion 122, bulkhead 134, or other structure located below a seat bottom 130. In examples, as shown in FIG. 7A, one or more floor sealing members 704 of a sealing system 102 may be provided along a perimeter of floor 700. In examples, one or more floor sealing members 704 may be provided along one or more portions of a perimeter of floor 700 that interface with one or more other components of vehicle 100. In examples, one or more floor sealing members 704 may be provided along one or more portions of a perimeter of floor 700 to seal one or more gaps between floor 700 and one or more components of vehicle 100 that interface with floor 700, such as, for example, one or more kickplates 136, one or more seats 120, one or more seat bottoms 130, one or more seat side portions 122, bulkhead 134, and/or one or more door sills 110. In examples, one or more floor sealing members 704 extend along the full perimeter of floor 700 as shown.

Figure 7B:
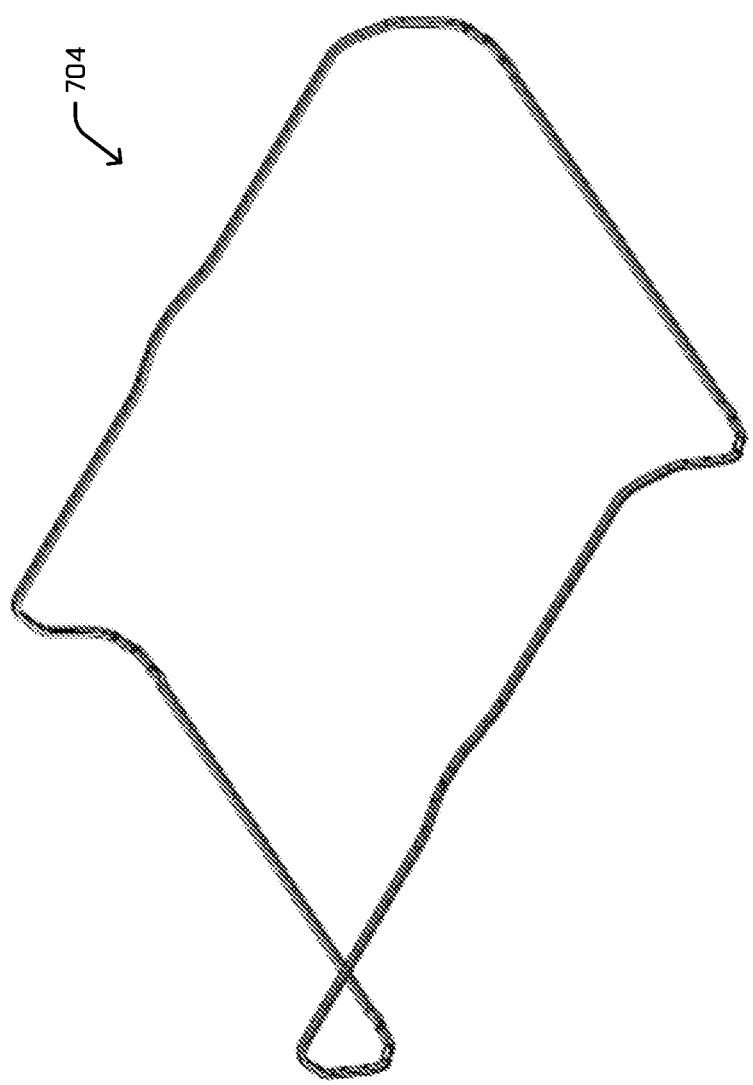

An example of floor sealing member 704 without showing floor 700 is further illustrated in FIG. 7B. In examples, one or more floor sealing members 704 may extend only a portion of the perimeter 706 of floor 700. In examples, one or more floor sealing members 704 of a sealing system 102 provided along a perimeter 706 of floor 700 may include continuous bodies or a set of separate bodies aligned serially along the floor perimeter. In examples, one or more floor sealing members 704 may be configured to channel fluid and/or waste material to floor collection area 146. In examples, one or more floor sealing members 704 may be configured to seal any gap that may be present between at an interface of at least a portion of floor 700 and at least a portion of a door sill 110. In examples, one or more floor seaming members 704 may be configured to function as floor trim 144. In examples, one or more floor sealing members 704 may be configured to prevent transit of fluid and/or waste material from floor collection area 146 to door sill 110. In examples, one or more floor sealing members 704 may channel fluid and/or waste material from members 152 of sealing system 102 located at other vehicle components to floor collection area 146.

Figure 7C:
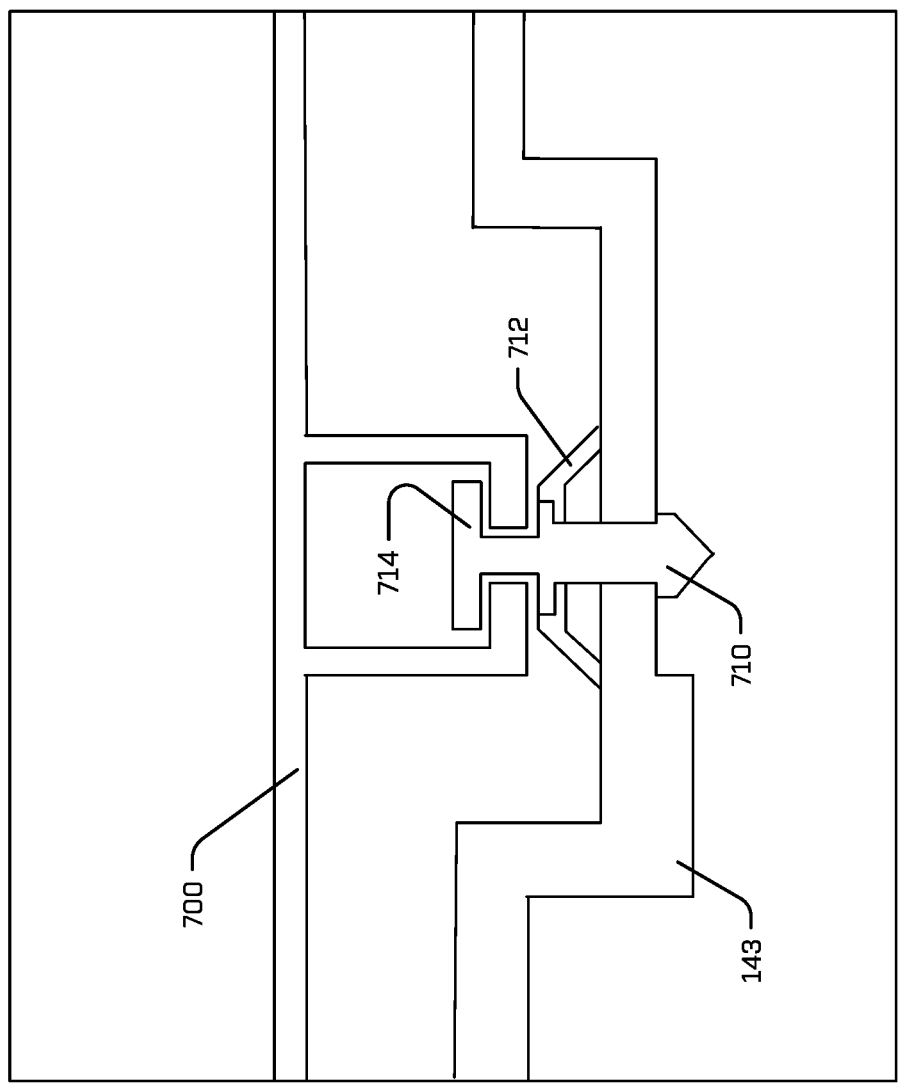

In examples, as shown in FIGS. 7A and 7C floor 108 and/or 700 may be fastened to vehicle frame such as portion 143 that defines under floor space 142 using one or more sealing fasteners 708. In examples, a sealing fastener 708 may include a clip 710 to engage a fitting in vehicle frame 143 with a sealing skirt 712. In examples, the sealing skirt 712 may be formed of the same or similar material as sealing members 152. In examples, sealing skirt 712 may include an elastomeric material, rubber or a rubber containing material.

In examples, sealing skirt 712 may include a flexible material. In examples, fastener 708 may also include a cap 714. Cap 714 may include a rigid structure. In examples, cap 714 may include a flat top surface. In examples, when fastener 708 is installed, cap 714 is configured to lie flush with the top surface of floor 700. In examples, fastener 708 may be configured such that when clip 710 engages floor 700 and vehicle frame 143, the sealing skirt 712 is pressed against the top surface of floor 700. In examples, as shown in the partial cross-sectional view provided in FIG. 7C, cap 714 may be configured to engage a bottom surface of floor 700 and/or 108. In examples, as illustrated in FIG. 7C, fastener 708 may be configured such that when clip 710 engages vehicle frame 143, the sealing skirt 712 is pressed between floor 108 and/or 700 and vehicle frame 143. In examples, a seal may be provided over the area where clip 710 is engaged to vehicle frame 143. In examples, providing this added seal may further assist in preventing and/or minimizing flow of fluid and/or waste material past floor 700 and potentially reach into under floor space 142.

In examples, at least a portion of sealing system 102 may be configured to channel fluid and/or waste material away from a window 124. FIG. 8A-8L illustrates examples in which one or more members 152 of a sealing system 102 may be provided along at least on portion of a window 124. As described earlier, in examples, a perimeter of window 124 may be defined by one or more of a first pillar 114, second pillar 116, and window trim 112. In examples, as illustrated in FIGS. 8A-8D, a window illustrated as 800 may include a perimeter 802 defined by at least one of each of first pillar 804, second pillar 806, and window trim 808. In examples, first pillar 804 may be provided between a window 800 and one end of vehicle 100. In examples, first pillar 804 is configured to provide structural support to the chassis of vehicle 100. In examples, second pillar 806 may be located next to or adjacent a vehicle door 138. In examples, the second pillar 806 may be located between a vehicle door 138 and a window 800. In examples, second pillar 806 may be configured to provide structural support to the chassis of vehicle 100. In examples, first pillar 804 and second pillar 806 may be in direct physical contact. In examples, at least a portion of first pillar 804 and at least a portion of second pillar 806 are configured to define at least a continuous portion of a perimeter 802 of window 800 when first pillar 804 is in contact with second pillar 806. In examples, a window trim 808 may be located along at least a portion of a perimeter 802 of a window 800. In examples, a window trim 808 may be located between first pillar 804 and second pillar 806. In examples, at least a portion of window trim 808, at least a portion of first pillar 804, and at least a portion of second pillar 806 are configured to form at least a continuous portion of a perimeter 802 of window 800. In examples, first pillar 804 and second pillar 806 are in direct physical contact with window trim 808. In examples, window trim 808 may contact first pillar 804 at a side opposite to a second side at which window trim 808 contact second pillar 806 for example illustrated in FIG. 8A.

Figure 8B:
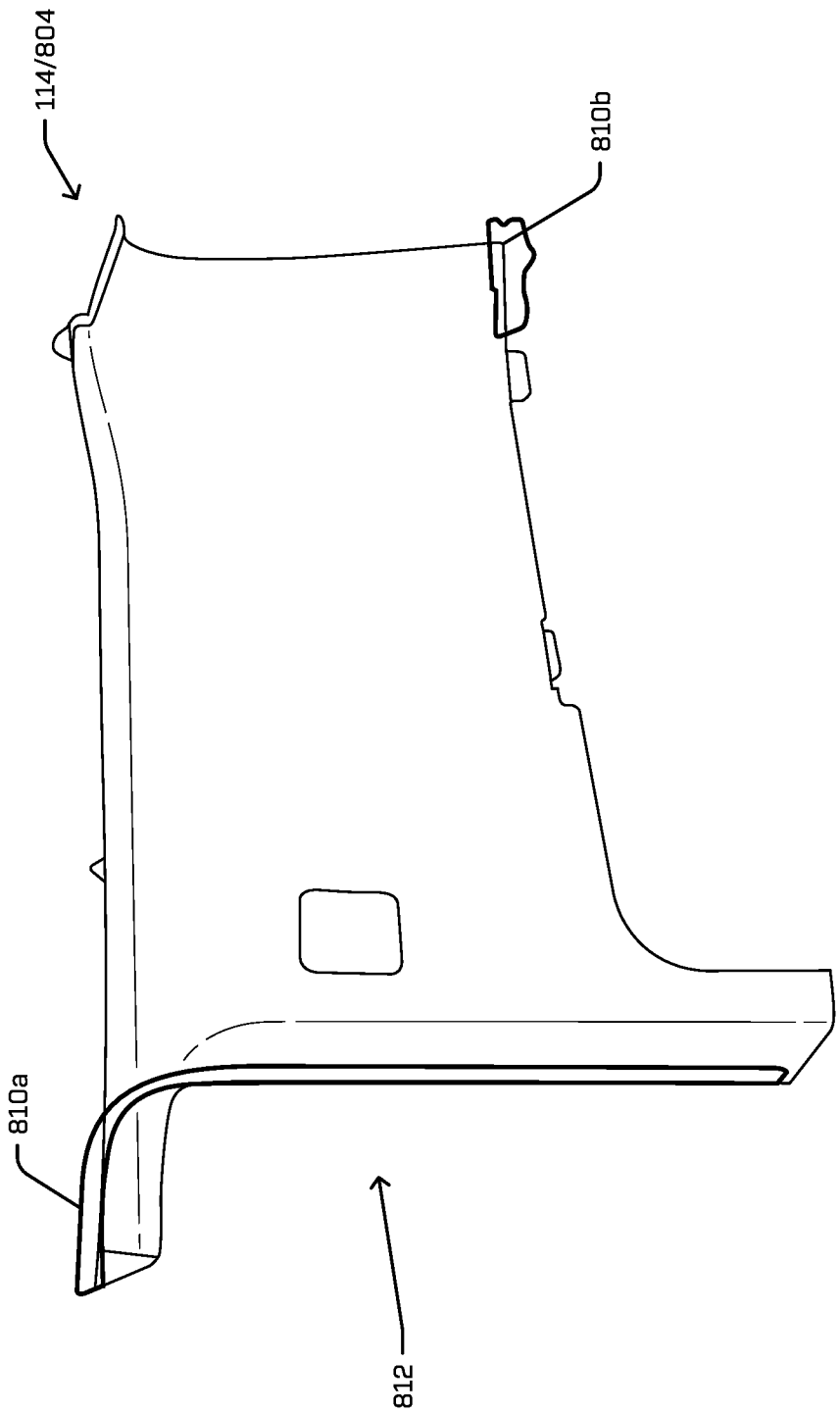

FIGS. 8B-8L illustrate examples of how one or more members 152 of a sealing system 102 may be provided along at least a portion of window 800 by installing them on one or more of first pillar 804, second pillar 806, and window trim 808. FIG. 8B illustrates an example a first pillar 804 having one or more first pillar sealing members 810 of a sealing system 102. In examples, one or more first pillar sealing members 810 may be provided along at least a portion 812 of first pillar 804 that is configured to define at least a portion of a perimeter 802 of window 800. In examples, a single contiguous first pillar sealing member 810 may be provided along the length of at least a portion 812 of first pillar 804 that is configured to define at least a portion of a perimeter 802 of window 800. In examples, two or more first pillar sealing members 810 may be aligned serially along at least a portion 812 of first pillar 804 that may be configured to define at least a portion of a perimeter 802 of window 800.

Figure 8C:
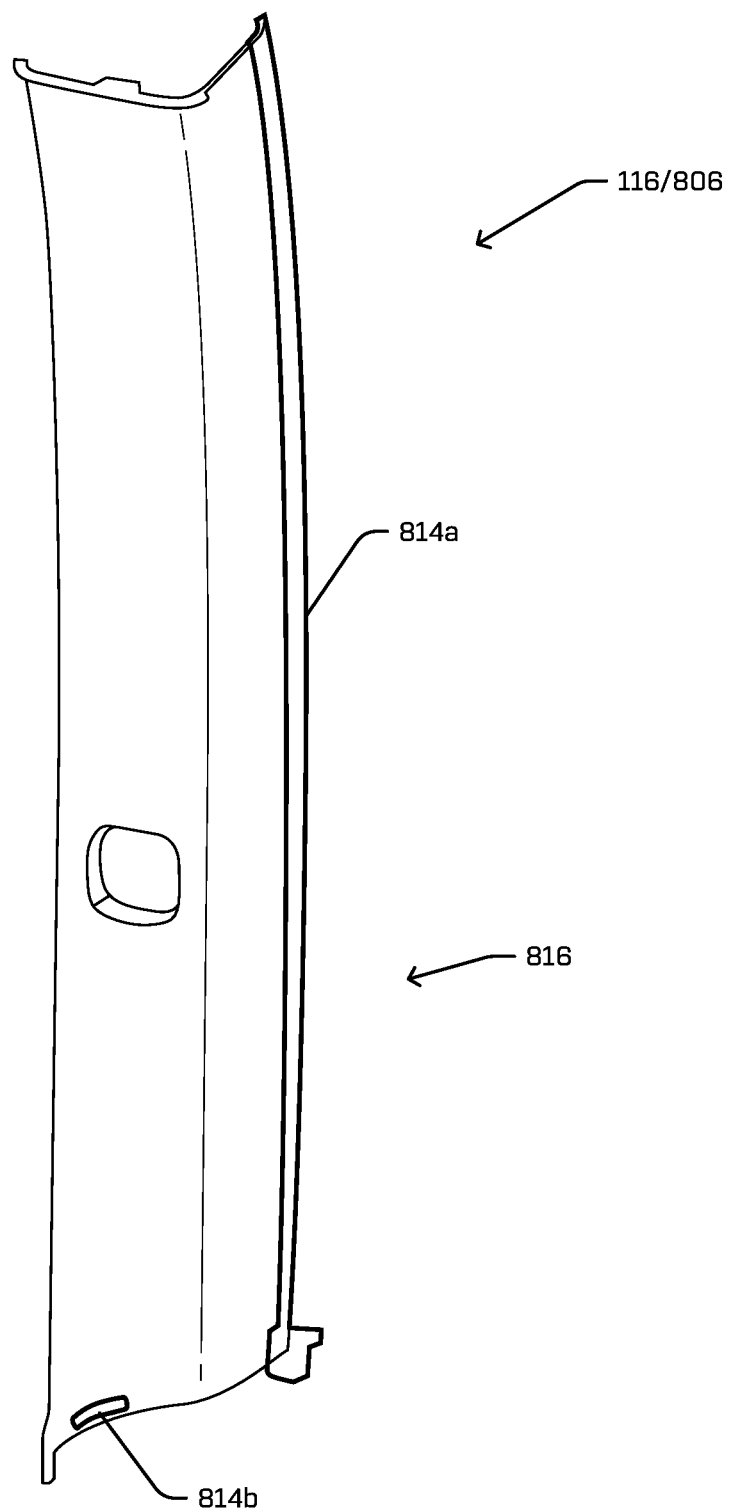
Figure 8D:
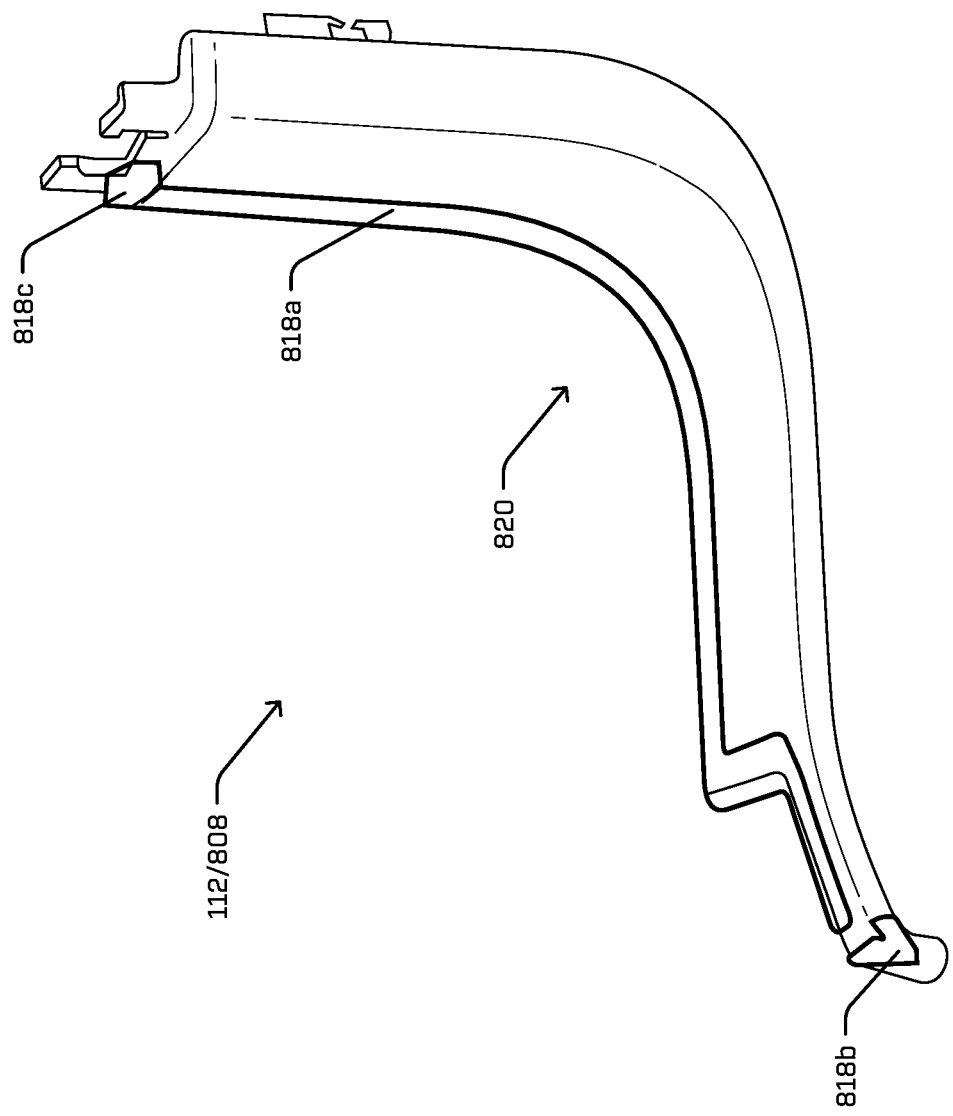

FIGS. 8C and 8D illustrate examples of shapes and designs for one or more first pillar sealing members 810. These are only examples and other designs and shapes may be employed. FIG. 8C illustrates an example of a first pillar sealing member 810*a* that may be disposed along at least a portion of a first pillar 804 that defines at least a portion of a perimeter 802 of window 800. As shown, in examples, the sealing member 810*a* to be located along window 800 may have a longitudinal, curved shape that may conform to the profile of the portion of first pillar 804 over which first pillar sealing member 810*a* is installed. In examples, first pillar sealing member 810*a* may include a cross-section defining one or more channels 824*a*.

FIG. 8D illustrates an example of a first pillar sealing member 810*b* that may be disposed at an interface of first pillar 804 and a speaker tray 118. In examples, FIG. 8D illustrates an example of a first pillar sealing member 810 that may be located at a corner interface with speaker tray 118. As illustrated, the first pillar sealing member 810*b* at the interface with speaker tray 118 may also include one or more channels 824*b* in its cross-section. As illustrated, the first pillar sealing member 810*b* provided at the interface with speaker tray 118 may be configured to seal a gap along at least a portion of the interface between speaker tray 118 and first pillar 804.

Figure 8F:
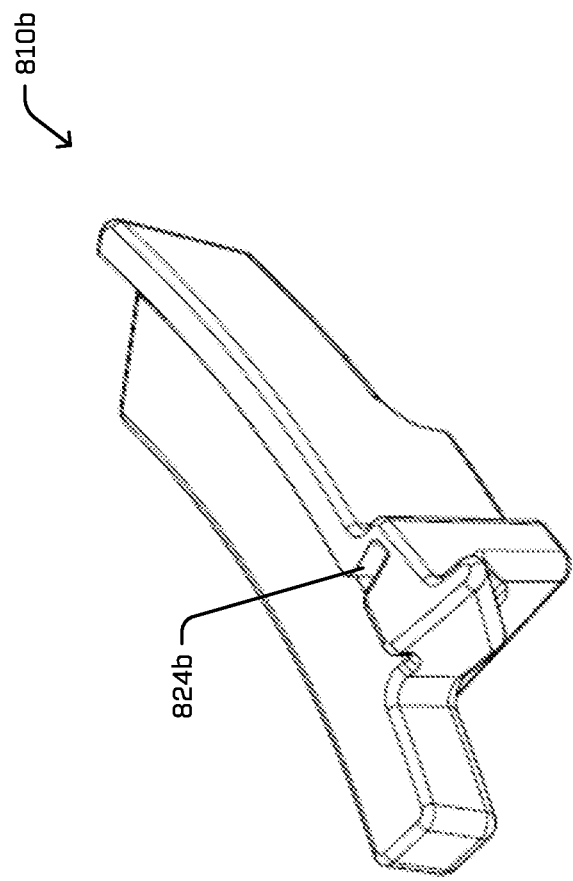
Figure 8E:
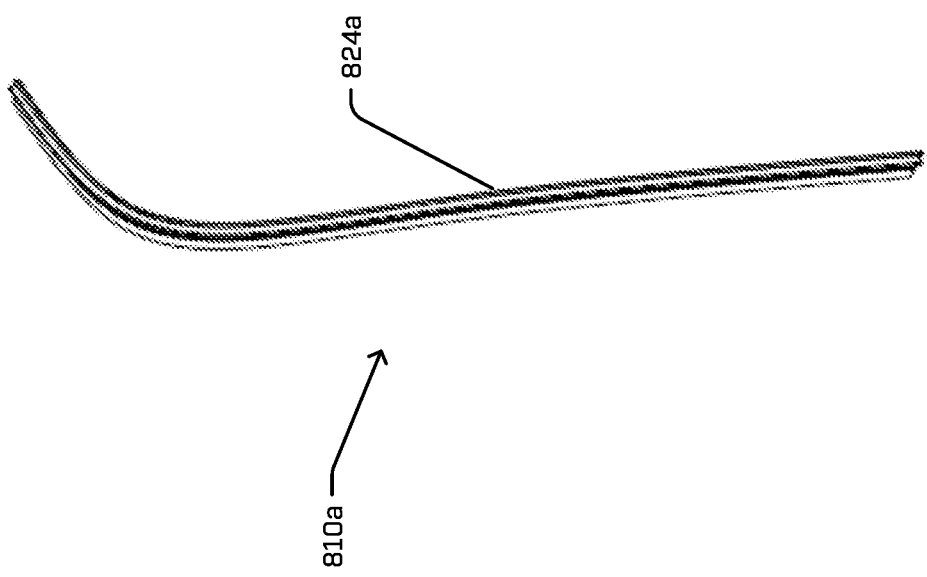

FIG. 8E illustrates an example a second pillar 806 having one or more second pillar sealing members 814 of a sealing system 102. In examples, one or more second pillar sealing members 814 may be extruded along at least a portion 816 of second pillar 806 that is configured to define at least a portion of a perimeter 802 of window 800. In examples, a single contiguous second pillar sealing member 814 is provided along the length of at least a portion 816 of second pillar 806 that is configured to define at least a portion of a perimeter 802 of window 800. In examples, two or more second pillar sealing members 814 may be aligned serially along at least a portion 816 of second pillar 806 that is configured to define at least a portion of a perimeter 802 of window 800.

FIGS. 8E and 8F illustrate examples of shapes and designs for one or more second pillar sealing members 814. These are only examples and other designs and shapes may be employed. FIG. 8E illustrates an example of a second pillar sealing member 814*a* that may be disposed along at least a portion of a second pillar configured to define at least a portion of a perimeter 802 of window 800. As shown, in examples, the sealing member 814*a* to be located along window 800 may have a longitudinal shape that may conform to the portion of second pillar 806 over which sealing member 814*a* is installed. In examples, second pillar sealing member 814*a* may include a cross-section defining one or more channels 826. FIG. 8G illustrates an example of a second pillar sealing member 814*b* that may be disposed at an interface of second pillar 806 and one or more of a portion of kickplate 136 and a portion of window trim 808. In examples, FIG. 8G illustrates an example of a second pillar sealing member 814*b* may include a block shape. Other shapes may also be implemented. As illustrated, the second pillar sealing member 814*b* provided at the interface with kickplate 136 and/or window trim 808 may be configured to seal a gap along at least a portion of the interface between second pillar 806 and one or both of at least a portion of window trim 808 and at least a portion of kickplate 136.

Figure 8H:
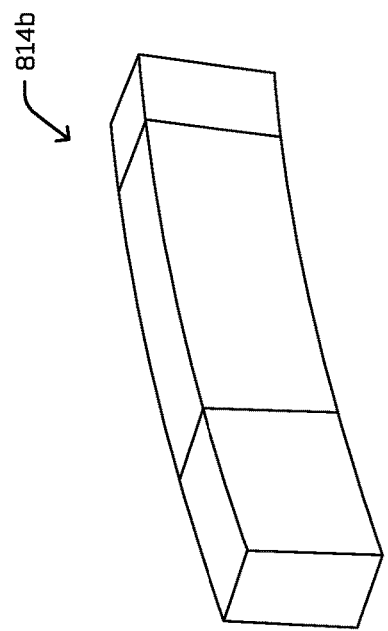
Figure 8G:
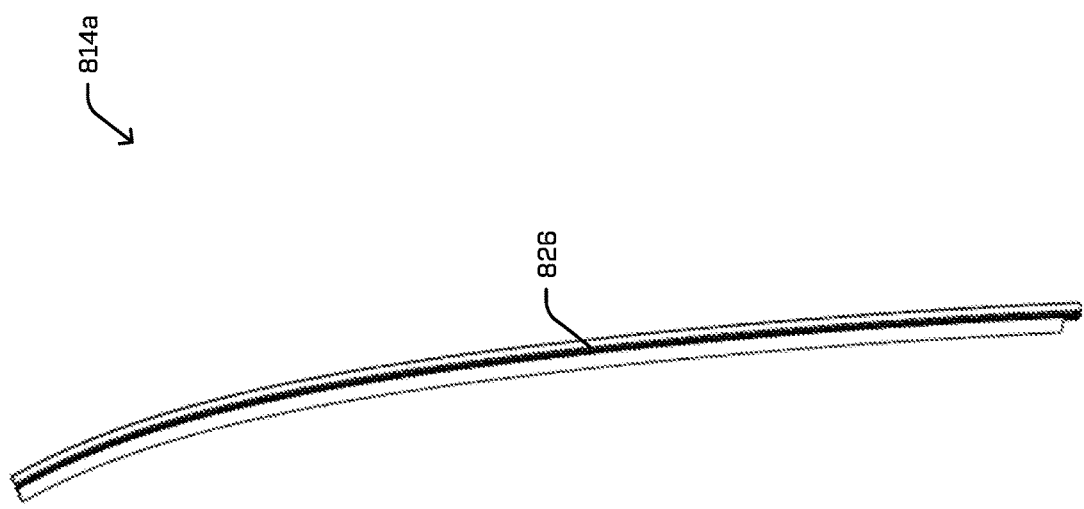

FIG. 8H illustrates an example a window trim 808 having one or more window trim sealing members 818 of a sealing system 102. In examples, one or more window trim sealing members 818 may be extruded along at least a portion 820 of window trim 808 that is configured to define at least a portion of a perimeter 802 of window 800. In examples, a single contiguous window trim sealing member 818 is provided along the length of at least a portion 820 of window trim 808 that is configured to define at least a portion of a perimeter 802 of window 800. In examples, two or more window trim sealing members 818 may be aligned serially along at least a portion 820 of window trim 808 that is configured to define at least a portion of a perimeter 802 of window 800.

Figure 8J:
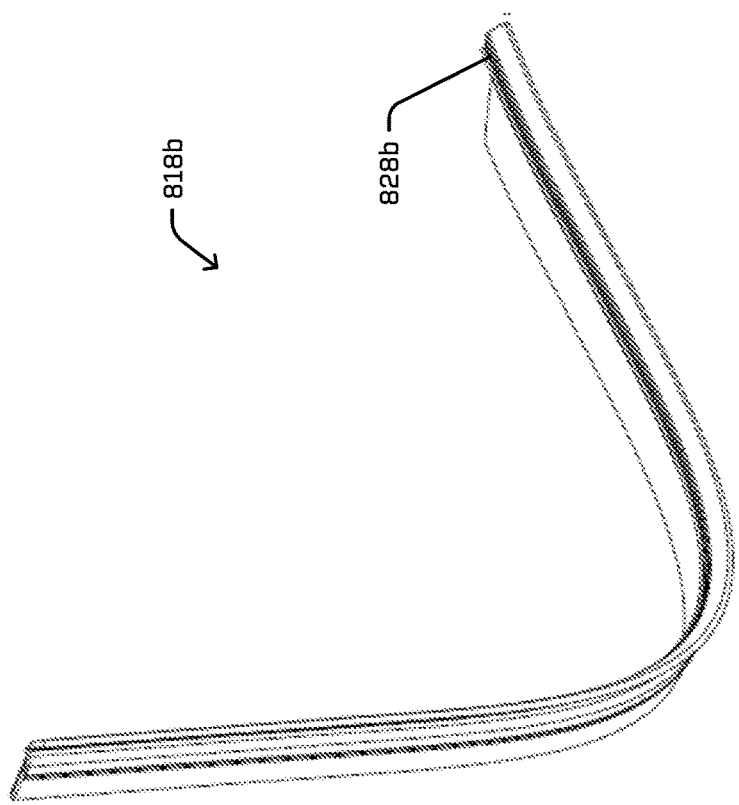
Figure 8I:
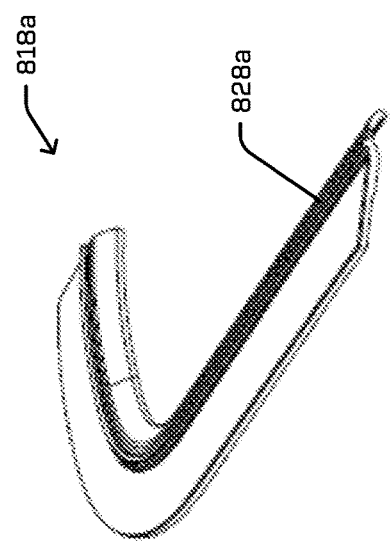

FIGS. 8I to 8L illustrate examples of shapes and designs for one or more window trim sealing members 818 of a sealing system 102. FIG. 8I illustrated an example of a window trim sealing member 818a configured to seal a gap at an interface window trim 808 and second pillar 806 and/or to connect window trim sealing member 818b to window trim sealing member 818d. As illustrated, window trim sealing member 818a may have a curved shape that may conform to the portion of window trim 808 upon which it is installed. In examples, window trim sealing member 818a may include a cross-section defining a channel 828a. In examples, window trim sealing member 818a may be configured to channel fluid and/or waste material from window 800 towards kickplate sealing member 604 and/or kickplate 136.

FIG. 8J illustrated an example of a window trim sealing member 818b configured to seal a gap at an interface window trim 808 and window pane 822 and/or connect window trim sealing member 818c to window trim sealing member 818a. As illustrated, window trim sealing member 818b may have a curved shape that may conform to the portion of window trim 808 upon which it is installed. In examples, window trim sealing member 818b may include a cross-section defining a channel 828b. In examples, window trim sealing member 818b may be configured to channel fluid and/or waste material from window 800 and/or first pillar 804 to window trim sealing member 818a.

Figure 8L:
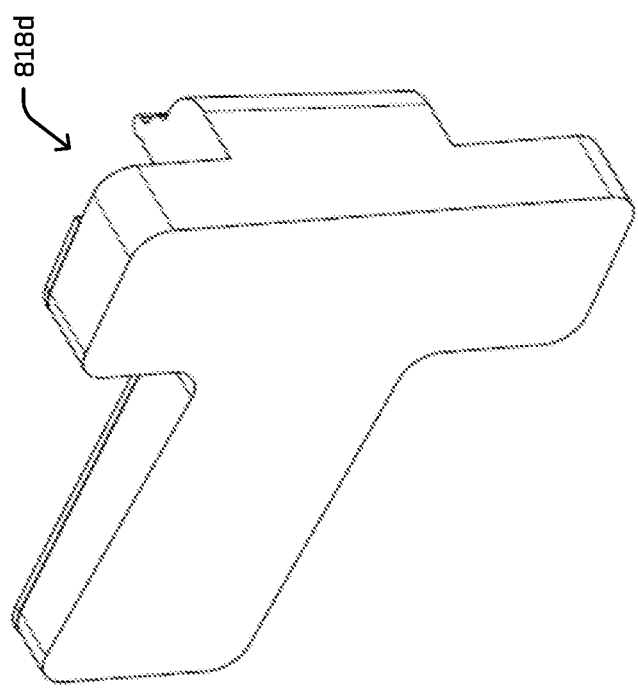
Figure 8K:
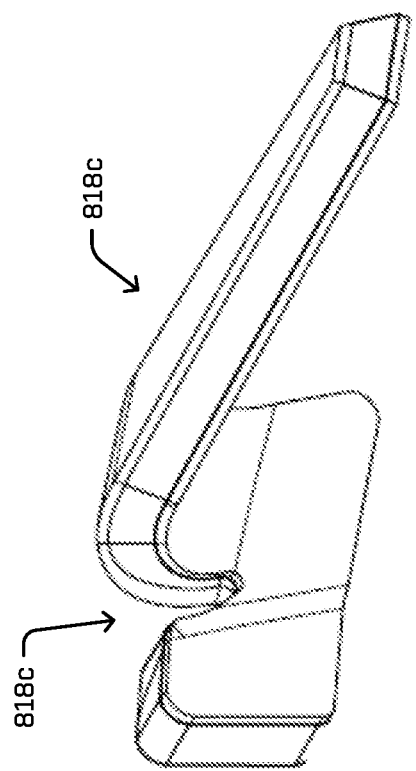

FIG. 8K illustrated an example of a window trim sealing member 818c configured to seal a gap at an interface window trim 808 and first pillar 804 and/or connect first pillar sealing member 810a to window trim sealing member 818b. As illustrated, window trim sealing member 818c may conform to the portion of window trim 808 upon which it is installed. In examples, window trim sealing member 818c may include an L-shape. In examples, window trim sealing member 818c may include a cross-section defining a channel 828c. In examples, window trim sealing member 818c may be configured to channel fluid and/or waste material from first pillar sealing member 810a and/or first pillar 804 to window trim sealing member 818b.

FIG. 8L illustrated an example of a window trim sealing member 818d configured to seal a gap at an interface window trim 808 and kickplate 136. As illustrated, window trim sealing member 818d may have a T-shape that may conform to the portion of window trim 808 upon which it is installed. In examples, window trim sealing member 818d may be configured to channel fluid and/or waste material from window trim 808 and/or window trim sealing member 818a to kickplate sealing member 604 and/or kickplate 136.

In examples, the one or more sealing members 810, 814, and 818 may be configured to seal one or more gaps between a window pane 822 and any one or more of first pillar 804, second pillar 806, and window trim 808. In examples, providing one or more sealing members 810, 814, and/or 818 along one or more portion of the perimeter of a window pane 822 may lower, reduce, or minimize noise inside the cabin. Lower noise may lead to improved ride experience. In examples, closed cell foam may be selected to form one or more sealing members 810, 814, and/or 818 to improve noise reduction. Other materials as previously described may also be used.

In examples, the one or more sealing members 810, 814, and 818 may be configured to seal one or more gaps between any two or more of first pillar 804, second pillar 806, and window trim 808. In examples, the one or more sealing members 810, 814, and 818 may be configured to seal one or more gaps between one or more components of vehicle 100 and any one or more of first pillar 804, second pillar 806, and window trim 808. In examples, the one or more sealing members 810, 814, and 818 may be configured to seal one or more gaps between a seat 120, seat end portion 122, and/or outer seat side surface 902, and any one or more of first pillar 804, second pillar 806, and window trim 808. In examples, the one or more sealing members 810, 814, and 818 may be configured to seal one or more gaps between kickplate 136 and/or floor 108 and any one or more of first pillar 804, second pillar 806, and window trim 808. In examples, the one or more sealing members 810, 814, and 818 may be configured to seal one or more gaps between a speaker tray 118 and any one or more of first pillar 804, second pillar 806, and window trim 808.

In examples, the one or more sealing members 810, 814, and 818 may be configured to collect any fluid and/or other waste material that may be spilled on window 800, in an area proximate or adjacent to window 800, or a combination of both. In examples, the one or more sealing members 810, 814, and 818 may be configured to form one or more channels along at least a portion of perimeter 802 of window 800. In examples, the one or more sealing members 810, 814, and 818 may be configured to channel fluid and/or other waste material away from window 800. In examples, the one or more sealing members 810, 814, and 818 may be configured to channel fluid and/or other waste material from window 800 to a floor collection area 146. In examples, the one or more sealing members 810, 814, and 818 may be configured to channel fluid and/or other waste material from window 800 to a different portion of sealing system 102. In examples, the one or more sealing members 810, 814, and 818 may be configured to channel fluid and/or other waste material from window 800 to one or more sealing members located at a seat side portion 122 as described herein. In examples, at least one of sealing members 810, 814, and 818 may be configured to extend to one or more sealing members located at a seat side portion 122 as described herein. In examples, at least one of sealing members 810, 814, and 818 may be configured to extend to and physically contact one or more sealing members located at a seat side portion 122. In examples, at least one of sealing members 810, 814, and 818 may be configured to extend to and be connected to one or more sealing members located at a seat side portion 122.

In examples, at least a portion of sealing system 102 may be configured to channel fluid and/or waste material from an upper portion of vehicle 100 to a lower portion of vehicle 100. In examples, at least a portion of sealing system 102 may be configured to channel fluid and/or waste material from a speaker tray 118 to a floor 108. In examples one or more sealing members 152 of a sealing system 102 may be provided along at least on portion of a seat side portion 122. In examples, a sealing system 102 may include an element provided at a longitudinal end of the seat 120, and/or seating area 106. In examples, seat side portion 122 may be located at an end portion of seat 120 proximate to, adjacent to, and/or in contact with a portion of vehicle 100 that include window 124. In examples, seat side portion 122 may be located at an end portion of seat 120 proximate to, adjacent to, and/or in contact with at least a portion of window trim 112, first pillar 114, second pillar 116, or any combination thereof.

Figure 9:
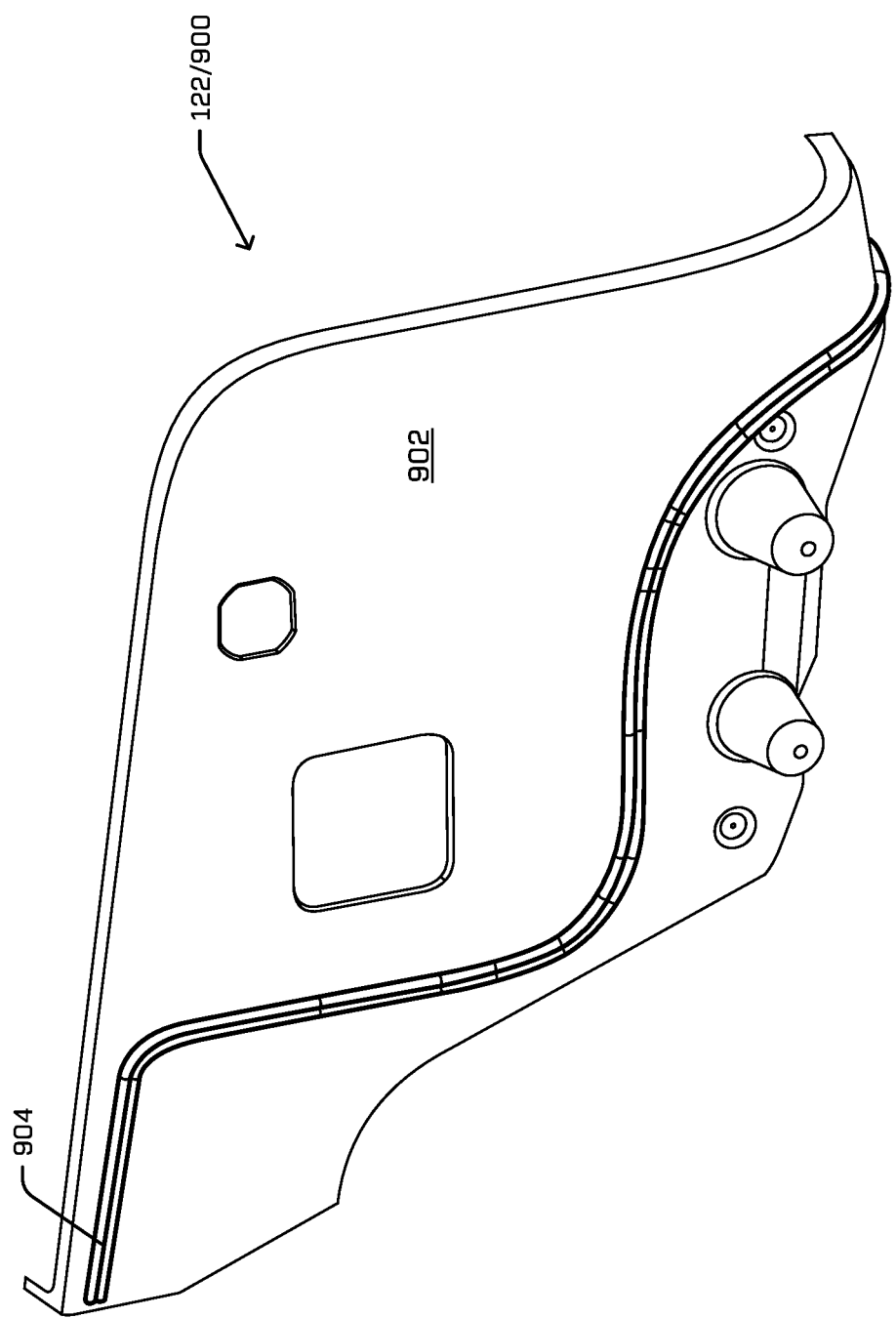
FIG. 9 illustrates an example of a seat side portion with one or more sealing members and examples of sealing members that may be applied to the seat side portion.

As illustrated in FIG. 9, in examples, a seat side portion 900 of a seat 120 may include an outer seat side surface 902. In examples, outer seat side surface 902 of seat side portion 900 may refer to the side of seat side portion 900 that faces away from seatback 128 and/or seat bottom 130. In examples, outer seat side surface 902 may be configured to face window 124 (or window 800). In examples, outer seat side surface 902 may be proximate to, adjacent to, and/or in contact with window 124 and/or window trim 112, first pillar 114, second pillar 116, or any combination thereof.

In examples, one or more seat side sealing members 904 may be provided on at least a portion of outer seat side surface 902. In examples, seat side sealing member 904 may have a generally down-sloping profile. In examples, seat side sealing member 904 may extend from an upper rear portion of seat side portion 900 to a bottom front portion of seat side portion 900. For purposes of this discussion, a "upper rear portion" of a seat side portion 900 refers to the portion of seat side portion 900 that is closest to one or more headrests 126 of a seat 120. For purposes of this discussion, a "bottom front portion" of a seat side portion 900 refers to the portion of seat side portion 900 that is closest to an end portion of seat bottom 130 that meets either kickplate 136 and/or floor 108.

In examples, seat side sealing member 904 may extend along at least a portion of a seating area 106 of vehicle 100. In examples, seat side sealing member 904 may include a profile that follows a front profile of seatback 128, seat bottom 130, or both. For purposes of this description, a front profile of seatback 128 and/or seat bottom 130 refers to the surface profile of these components of seat 120, which surface is configured to contact a passenger when a passenger is sitting on seat 120 in seating area 106. In examples, seat side sealing member 904 may include a profile that does not follow a front profile of seatback 128, seat bottom 130, or both.

In examples, seat side sealing member 904 may be configured to seal a gap between outer seat side surface 902 and at least a portion of the chassis of vehicle 100. In examples, seat side sealing member 904 may be configured to seal a gap between outer seat side surface 902 and at least a side portion of vehicle 100. In examples, seat side sealing member 904 may be configured to seal a gap between outer seat side surface 902 and at least a portion of any one or more of window trim 112, first pillar 114, and second pillar 116. In examples, seat side sealing member 904 may be configured to seal a gap between outer seat side surface 902 and at least a portion of speaker tray 118, kickplate 136, and/or floor 108. In examples, seat side sealing member 904 may be configured to seal a gap between outer seat side surface 902 and one or more other components of vehicle 100.

In examples, seat side sealing member 904 may be configured to channel fluid and/or other waste material to floor collection area 146. In examples, seat side sealing member 904 may be configured to channel fluid and/or other waste material directly or indirectly by way of one or more other sealing members 152 such as for example one or more kickplate sealing members 604 to one or more sealing members 704. In examples, seat side sealing member 904 may be configured to channel fluid and/or other waste material spilled on or in proximity of outer seat side surface 902 to floor collection area 146, floor sealing member 704, or both. In examples, seat side sealing member 904 may be configured to include a cross-section that includes a channel 906.

In examples, seat side sealing member 904 may be connected to one or more sealing members 704. In examples, seat side sealing member 904 may be connected to one or more sealing members 704 via one or more kickplate sealing members 604. In examples, seat side sealing member 904 may be in physical contact with one or more sealing members 704.

In examples, seat side sealing member 904 may be configured to channel fluid and/or other waste material from speaker tray 118 to floor collection area 146, kickplate sealing member 604, floor sealing member 704, or any combination thereof. In examples, at least a portion of seat side sealing member 904 may be configured to channel fluid and/or other waste material from one or more sealing members in speaker tray 118 to floor collection area 146, kickplate sealing member 604, floor sealing member 704, or any combination thereof. In examples, at least a portion of seat side sealing member 904 may be connected to one or more sealing members 1002 in speaker tray 118 to floor collection area 146, kickplate sealing member 604, floor sealing member 704, or any combination thereof. In examples, at least a portion of seat side sealing member 904 may be in physical contact with one or more sealing members 1002 in speaker tray 118 to floor collection area 146, kickplate sealing member 604, floor sealing member 704, or any combination thereof.

In examples, seat side sealing member 904 may be configured to channel fluid and/or other waste material from window 124 to floor collection area 146, floor sealing member 704, or both. In examples, at least a portion of seat side sealing member 904 may be configured to channel fluid and/or other waste material from one or more sealing members on at least one of window trim 112, first pillar 114, and second pillar 116 to floor collection area 146, kickplate sealing member 604, floor sealing member 704, or any combination thereof. In examples, at least a portion of seat side sealing member 904 may be connected to one or more sealing members 810, 814, and 818 to floor collection area 146, kickplate sealing member 604, floor sealing member 704, or any combination thereof. In examples, at least a portion of seat side sealing member 904 may be in physical contact with one or more sealing members 810, 814, and 818 and to floor collection area 146, kickplate sealing member 604, floor sealing member 704, or any combination thereof.

Figure 10A:
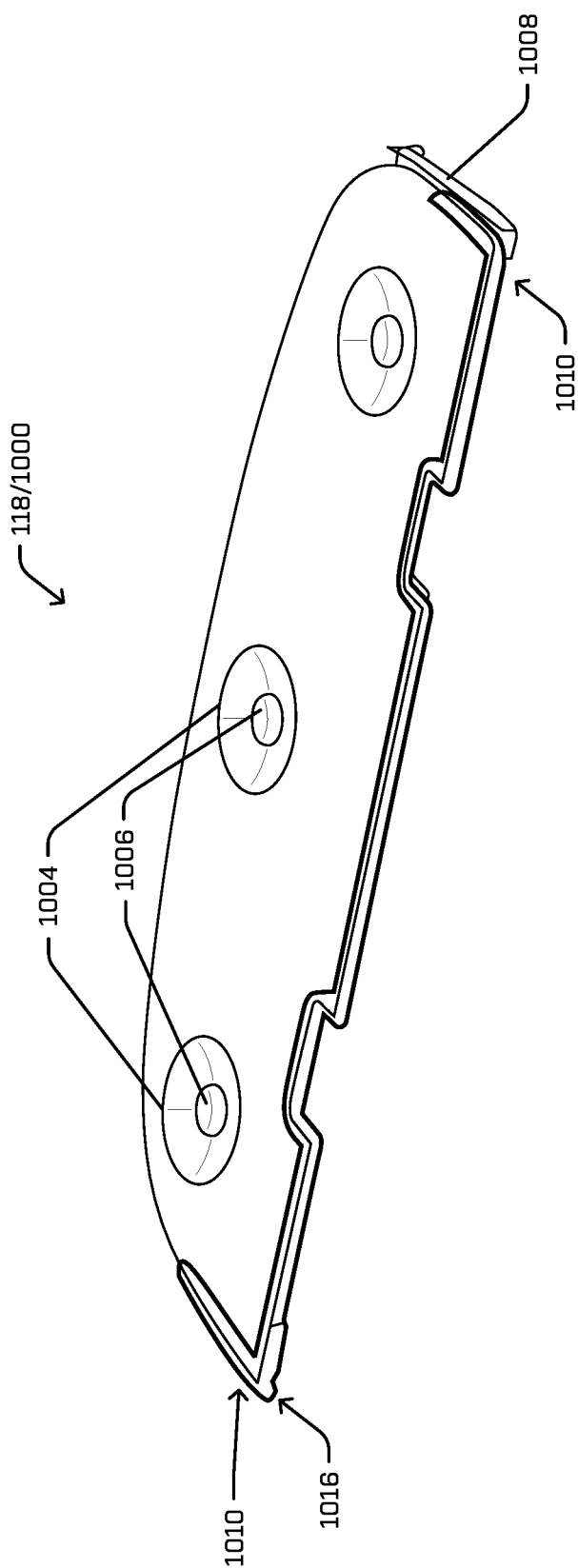
FIGS. 10A to 10C illustrate examples of a speaker tray with one or more sealing members and examples of sealing members that may be applied to the speaker tray.
Figure 10B:
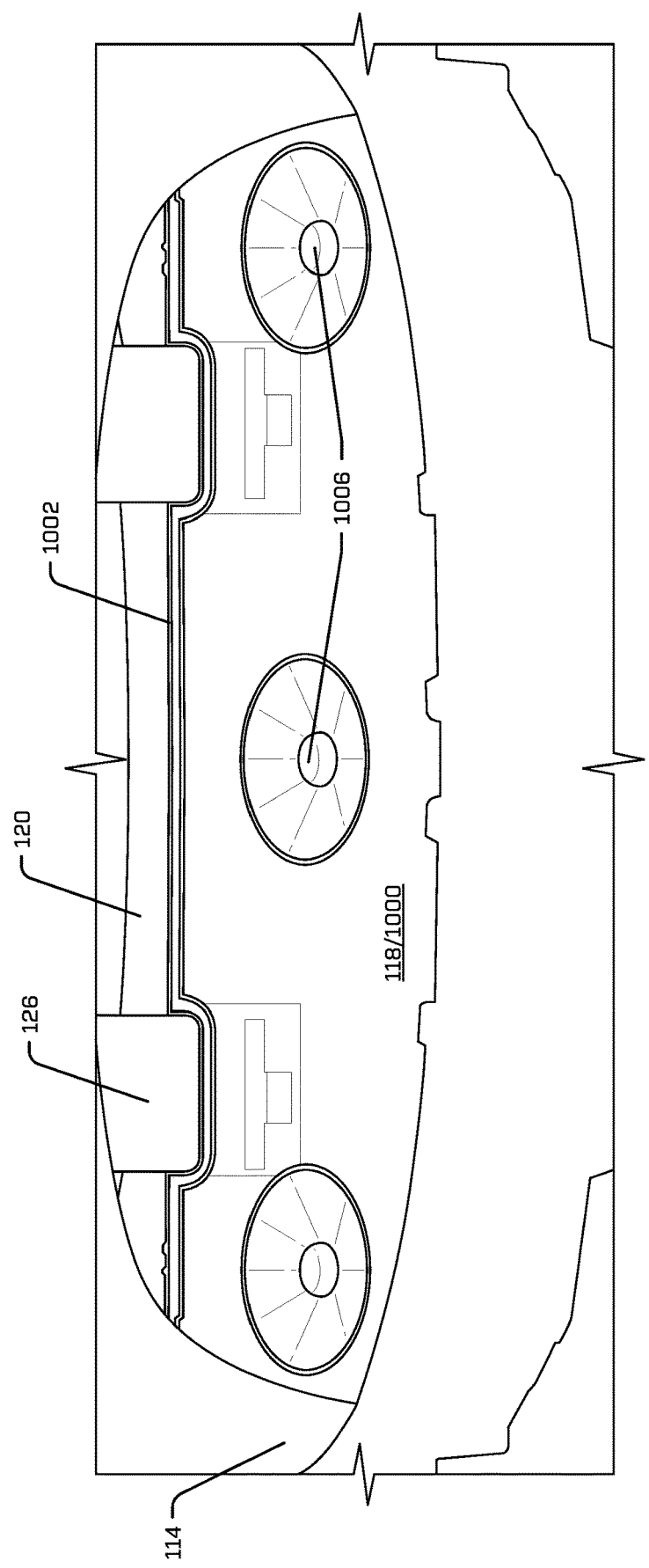

In examples, at least a portion of sealing system 102 may be configured to channel fluid and/or waste material away from speaker tray 118. In examples, at least a portion of sealing system 102 may be configured to prevent, at least in part, fluid and/or waste material from reaching one or more electronic components 166 that may be located under and/or below speaker tray 118. In examples, providing one or more sealing members on speaker tray 1000 as described herein can assist in reducing, lower, or minimizing noise inside vehicle 100. FIGS. 10A and 10B illustrate examples of sealing members 152 in speaker tray 118. FIG. 10A illustrates an example of a speaker tray 1000 having one or more speaker tray sealing members 1002. As illustrated, speaker tray 1000 may have a generally quadrilateral shape. Speaker tray may have any desired shape. In examples, the shape of speaker tray 1000 may be dependent on the design of the chassis of vehicle 100. In examples, speaker tray 1000 may extend from a portion of seat 120 to an end portion of vehicle 100. In examples, speaker tray 1000 may extend from an end portion of seat 120 proximate to, adjacent to, and/or in contact with one or more headrests 126 to an end portion of vehicle 100. In examples, speaker tray 1000 may be proximate, adjacent, or in contact with an end portion of seat 120 proximate to, adjacent to, and/or in contact with one or more headrests 126 to an end portion of vehicle 100. In examples, speaker tray 1000 may be proximate, adjacent, or in contact with one or more first pillars 114 of vehicle 100. In examples, speaker tray 1000 may extend from one first pillar 114a on a first side 107 of vehicle 100 to another first pillar 114b on a second side 109 of vehicle 100, opposite the first side. In examples, speaker tray 1000 may be proximate, adjacent, or in contact with an end portion 103 or 105 of vehicle 100. In examples, speaker tray 1000 may be located between a first pillar 114a on a first side 107 of vehicle 100, a first pillar 114b on a second side 109 of vehicle 100, a portion of seat 120, and an end portion of vehicle 100.

As illustrated, speaker tray 1000 may include one or more speaker openings 1004 As illustrated, speaker tray 1000 may include one or more speaker openings 1004. A speaker opening 1004 may be configured to house one or more speakers 1006.

In examples, a speaker tray 1000 may include one or more speaker tray sealing members 1002. In examples, a speaker tray 1000 may include one or more speaker tray sealing members 1002 along at least a portion of one or more of its sides. In examples, one or more speaker tray sealing members 1002 may be provided along the full perimeter of speaker tray 1000. A speaker tray sealing member 1002 may be provided on at least a portion of speaker tray 1000. In examples, one or more speaker tray sealing members 1002 may be configured to seal one or more gaps between speaker tray 1000 and one or more components and/or the chassis of vehicle 100. In examples, one or more speaker tray sealing members 1002 may be configured to seal one or more gaps between speaker tray 1000 and at least a portion of seating area 106, seat 120, seatback 128, one or more headrests 126, or any combination thereof. In examples, one or more speaker tray sealing members 1002 may be configured to seal one or more gaps along a longitudinal end of the seating area 106, seat 120, seatback 128, or any combination thereof. In examples, one or more speaker tray sealing members 1002 may be configured to seal one or more gaps between speaker tray 1000 and one or more portions of the chassis of a vehicle 100. In examples, one or more speaker tray sealing members 1002 may be configured to seal one or more gaps between speaker tray 1000 and one or more portions of one or more first pillars 114.

In examples, one or more speaker tray sealing members 1002 may include a continuous sealing member or multiple sealing structures. In examples, at least a portion of speaker tray sealing member 1002 include two or more serially arranged consecutive sealing structures. In examples, one or more speaker tray sealing members 1002 may extend from at least a first portion of speaker tray 1000 configured to be proximate, adjacent, and/or in contact with a first pillar 114 to at least a second portion of speaker tray 1000 configured to be proximate, adjacent, and/or in contact with at least a portion of one or more of seat 120, seatback 128, and headrest 126.

In examples, one or more speaker tray sealing members 1002 may be configured to collect fluid and/or other waste material spilled over or proximate to speaker tray 1000. In examples, one or more speaker tray sealing members 1002 may be configured to channel fluid and/or other waste material from speaker tray 1000 to another portion of vehicle 100. In examples, one or more speaker tray sealing members 1002 may be configured to channel fluid and/or other waste material from speaker tray 1000 to floor collection area 146. In examples, one or more speaker tray sealing members 1002 may be configured to channel fluid and/or other waste material from speaker tray 1000 to one or more seat side sealing members 904. In examples, at least a portion of one or more speaker tray sealing members 1002 may be proximate to, adjacent to, or in contact with one or more seat side sealing members 904. In examples, at least a portion of one or more speaker tray sealing members 1002 may be connected to one or more seat side sealing members 904. In examples, at least a portion of one or more speaker tray sealing members 1002 may be in physical contact with one or more seat side sealing members 904.

Figure 10C:
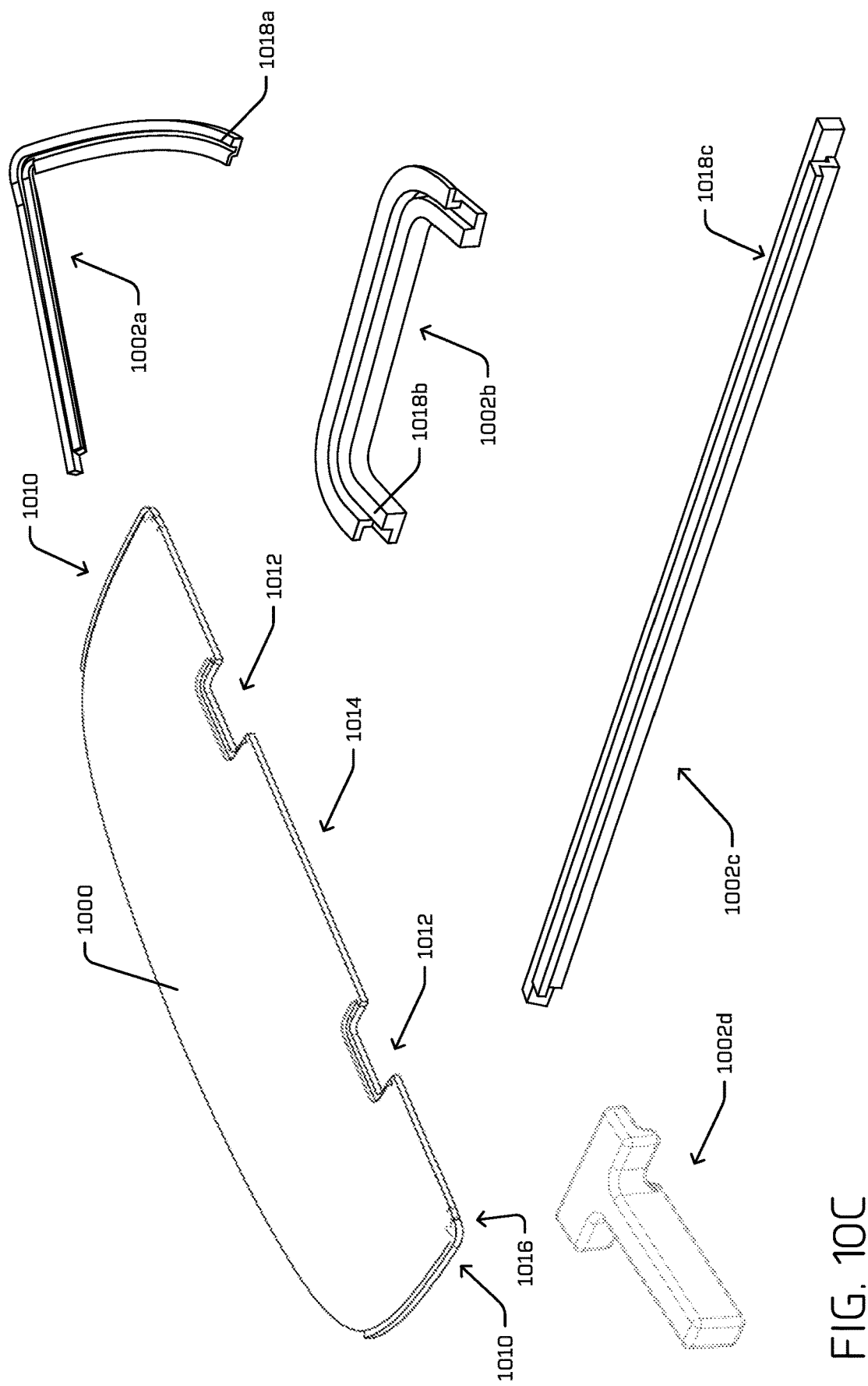

FIG. 10C illustrates examples of shapes and designs for one or more speaker tray sealing members 1002 of a sealing system 102. As illustrated speaker tray sealing members 1002 may be provided along various portions of a speaker tray 1000.

In examples, a speaker tray sealing member 1002a may be provide at one or both of a speaker tray rear corner 1010. As illustrated, speaker tray sealing member 1002a may have a shape that conform to the portion of speaker tray rear corner 1010 upon which it is installed. For purposes of this description, speaker tray rear corner 1010 refers to a corner portion of speaker tray 1000 that is proximate to, adjacent to, and/or in contact with at least a portion of seat 120 and/or seatback 128 and a first pillar 114. As illustrated, speaker tray sealing member 1002a may include a cross-section defining a channel 1018a. In examples, one or more speaker tray sealing member 1002a may be configured to seal one or more gaps that may be present along an interface of one or more rear corner portions of speaker tray 1000 and a first pillar 114, seat 120 and/or seatback 128, or any combination thereof. In examples, one or more speaker tray sealing member 1002a may be configured to channel a fluid and/or waste material to one or more other speaker tray sealing members to cause fluid and/or waste material to travel toward seat side sealing member 904, a channel formed in bulkhead 134, or a combination of both.

In examples, a speaker tray sealing member 1002b may be provide at one or more interface areas of a speaker tray 1000 and one or more headrests 126. As illustrated, speaker tray sealing member 1002b may have a shape that conform to the portion of speaker tray 1000 upon which it is installed. As illustrated, speaker tray sealing member 1002b may include a cross-section defining a channel 1018b. In examples, one or more speaker tray sealing member 1002b may be configured to seal one or more gaps that may be present along an interface of one or more portions of speaker tray 1000 and a headrest 126. In examples, a separate speaker tray sealing member 1002b is provided at east portion of speaker tray 1000 that interfaces with a headrest 126. In examples, one or more speaker tray sealing member 1002b may be configured to channel a fluid and/or waste material to one or more other speaker tray sealing members to cause fluid and/or waste material to travel toward seat side sealing member 904, a channel formed in bulkhead 134, or a combination of both.

In examples, a speaker tray sealing member 1002c may be provide at one or more interface areas of a speaker tray 1000 and one or more portions of seat 120 and/or portion of seatback 128. As illustrated, speaker tray sealing member 1002*c* may have a shape that conform to the portion of speaker tray 1000 upon which it is installed. As illustrated, speaker tray sealing member 1002*c* may include a cross-section defining a channel 1018*c*. In examples, one or more speaker tray sealing member 1002*c* may be configured to seal one or more gaps that may be present along an interface of one or more portions of speaker tray 1000 and one or more portions of seat 120 and/or portion of seatback 128. In examples, as illustrated, the interface portion along which speaker tray sealing member 1002*c* is provided may extend between two headrests 126 and/or between two speaker tray sealing members 1002*b*. In examples, one or more speaker tray sealing member 1002*c* may be configured to channel a fluid and/or waste material to one or more other speaker tray sealing members to cause fluid and/or waste material to travel toward seat side sealing member 904, a channel formed in bulkhead 134, or a combination of both.

In examples, a speaker tray sealing member 1002*d* may be provide at one or more interface areas of a speaker tray sealing member 1002 and one or more other portions of sealing system 102. For examples, a speaker tray sealing member 1002*d* may be provide at one or more interface areas between a speaker tray sealing member 1002 and a seat side sealing member 904. As illustrated, speaker tray sealing member 1002*d* may have a T-shape that conform to the portion of speaker tray 1000 and portion of other vehicle component, such as for example seat 120, seat side portion 122, and/or first pillar 114, upon which it is installed. In examples, one or more speaker tray sealing member 1002*d* may be configured to seal one or more gaps that may be present along an interface of one or more portions of speaker tray 1000 and one or more portions of seat side portion 122, seat 120 and/or seatback 128, and/or first pillar 114. In examples, one or more speaker tray sealing member 1002*d* may be configured to channel a fluid and/or waste material from one or more other speaker tray sealing members to one or more other sealing members 152 of sealing system 102. For example, one or more speaker tray sealing member 1002*d* may be configured to channel a fluid and/or waste material from one or more other speaker tray sealing members 1002 to one or more other sealing members 904. In examples, one or more speaker tray sealing member 1002*d* may be configured to connect one or more speaker tray sealing members 1002 to one or more one or more other sealing members 152 of sealing system 102. For example, one or more speaker tray sealing member 1002*d* may be configured to connect one or more speaker tray sealing members 1002 to one or more one or seat side sealing member 904.

Figure 11:
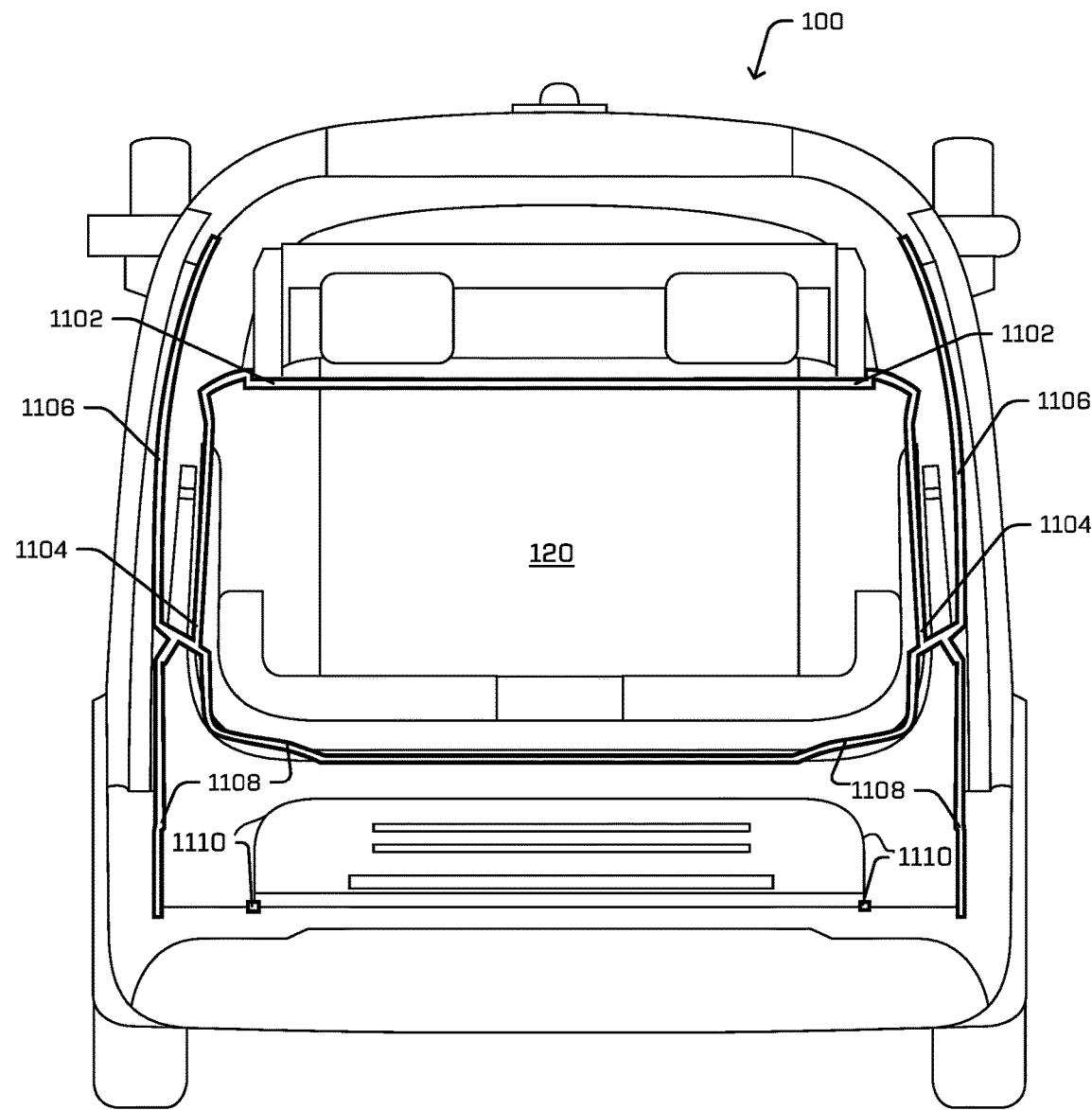
FIG. 11 illustrates an example arrangement for a sealing system structure as described herein.

In examples, sealing system 102 may include one or more floor sealing members 704, one or more kickplate sealing members 604, one or more of first pillar sealing members 810, one or more of second pillar sealing members 814, one or more of window trim sealing members 818, seat side sealing members 904, and one or more speaker tray sealing members 1002, or any combination thereof. In examples, sealing system 102 may include one or more sealing members in addition to and/or in combination with any of one or more floor sealing members 704, one or more kickplate sealing members 604, one or more of first pillar sealing members 810, one or more of second pillar sealing members 814, one or more of window trim sealing members 818, seat side sealing members 904, and one or more speaker tray sealing members 1002. In examples, as illustrated in FIG. 11, sealing system 102 may extend to different portions of vehicle 100 and/or vehicle cabin 104. FIG. 11 is a cross section view of a vehicle 100 facing a seat 120 and/or seating area 106. As shown, in examples, sealing system 102 may extend across a top portion 1102 of seat 120 from a first side 107 of vehicle 100 to a second side 109 of vehicle 100. In examples, sealing system 102 extending along portion 1102 may seal a gap between a speaker tray 118 and a portion of seat 120 proximate or adjacent to one or more headrests 126. In examples, sealing system 102 may extend along a portion 1104 from a speaker tray area 118 to a kickplate 136. In examples, examples, sealing system 102 may extend along portion 1106 along a window 124. In examples, sealing system 102 may extend along a bottom portion 1108 of seat 120. In examples, sealing system 102 may include one or more elements 1110 at and/or reaching floor 108. In examples, sealing system 102 provides a continuous structure along two or more portions 1102, 1104, 1106, and 1108. In examples, sealing system 102 provides continuous channeling along two or more portions 1102, 1104, 1106, and 1108. In examples, sealing system 102 provides continuous channeling along two or more portions 1102, 1104, 1106, and 1108, and defines a collection area with one or more elements 1110.

As illustrated in FIG. 11, sealing system 102 can extend along both sides of seat 120 and/or seating area 106. This is only an example. Sealing system 102 may be provided to extend along either or both sides of seat 120 and/or seating area 106. In examples, sealing system 102 may extend along only one side of seat 120 and/or seating area 106. In examples, sealing system 102 may extend, as illustrated, along both sides of seat 120 and/or seating area 106. In examples, sealing system 102 may extend symmetrically along both sides of seat 120 and/or seating area 106. In examples sealing system 102 may extend also along an opposite side of seat 120 and/or seating area 106 of the side shown in FIG. 11 in a similar fashion including one or more kickplate sealing members 604, one or more of first pillar sealing members 810, one or more of second pillar sealing members 814, one or more of window trim sealing members 818, seat side sealing members 904, or any combination thereof, and connecting to the same or different one or more floor sealing members 704, and one or more speaker tray sealing members 1002 as the illustrated profile shown in FIG. 11.

Also, while FIG. 11 illustrates sealing system 102 extending along only one seat 120 and/or seating area 106, in examples where the vehicle 100 includes two or more seats, sealing system 102 may be provided along one or both sides of any one or more of the two or more seats. In examples, vehicle 100 may include carriage style seating with two seats 120 facing each other. In such examples, a sealing system 102 may be provided on one or both sides of each seat 120 of the two seats arranged as carriage style. In such examples, any spill of fluid or other waste material on the speaker tray at either end of vehicle 100, along any one or more of the windows of vehicle 100, or other area described above may be collected into floor collection area 146. In examples where vehicle 100 may include a single floor collection area 146 to collect fluid and/or other waste material from one or more area of vehicle 100 where a sealing system 102 is provided.

Moreover, in examples where vehicle 100 may include two or more seats 120 and/or seating areas 106, a bulkhead 134 as described herein may be provide for each seat and/or seating area and function as described each with either its own one or more troughs or with one or more common or shared troughs.

In examples, a spill of fluid and/or other waste material in a wet area of vehicle 100 may be collected by sealing system 102. In examples, a wet area of vehicle 100 may include an area above speaker tray 118. In examples, a wet area of vehicle 100 may include an area over seat 120. In examples, a wet area of vehicle 100 may include an area between seat side portion 122 and window 124. In examples, a wet area of vehicle 100 may include an area between seat side portion 122 and any one or more of a window trim 112, first pillar 114, and second pillar 116. In examples, a wet area of vehicle 100 may include an area above floor 108. In examples, a wet area of vehicle 100 may include an area between a first kickplate 136 located by a first seating area 106a, and a second kickplate 136 located by a second seating area 106b.

In examples, sealing system 102 may be configured to channel any fluid and/or other waste material collected by sealing system 102 to floor collection area 146, trough 156, or both. In examples, bulkhead 134 may be configured to channel fluid and/or other waste material spilled in a wet area and collected by one or more fasteners or connectors 1008, and/or not collected by sealing system 102 to a trough 156, floor collection area 146, or both.

In examples, as shown in FIG. 10A, a speaker tray 1000 may include one or more fasteners or connectors 1008 be connected to one or more first pillars 114 via. In examples, any suitable connector or fastener may be used as fastener 1008. In examples, connector or fastener 1008 may include a bracket, clip, fitting or like structures. In examples, connector or fastener 1008 may include one or more screws, bolts, adhesive or other like structure to secure speaker tray 1000 to a first pillar 114. In examples, to assist with collecting and channeling fluid and/or waste material away from speaker tray 1000, one or more connectors or fasteners 1008 may be configured to channel fluid and/or other waste material. In examples, one or more connectors or fasteners 1008 may be configured to channel fluid and/or other waste material spilled over or on speaker tray 1000 away from speaker tray 1000. For example, as illustrated in FIG. 10A, a connector or fastener 1008 may include a U-shape or channel. In examples, the connector or fastener 1008 may be configured to receive at least a portion of a first pillar 114 when connected to speaker tray 118. In examples, an edge or border of first pillar 114 may be received by a channel shaped connector or fastener 1008. In examples, connector and/or fastener 1008 may be configured to catch at least part of a fluid and/or waste material that may fall between speaker tray 118 and first pillar 114. In examples, one or more connectors or fasteners 1008 may be configured to channel fluid and/or other waste material spilled over or on speaker tray 1000 to at least a portion of bulkhead 134. In examples, speaker tray 118 as a whole may be in a tilted or inclined position. In examples, speaker tray 118 may be inclined such that one end of speaker tray 118 distal from seat 120, seating area 106, and/or bulkhead 134 is elevated relative to the another end of speaker tray 118 that is proximate, adjacent, and/or in contact with to seat 120, seating area 106, and/or bulkhead 134. In examples, speaker tray 118 may be inclined and/or tilted forward toward floor 108, seat 120, seating area 106, and/or bulkhead 134. In examples, by having speaker tray 118 tilted or inclined, a fluid and/or waste material collected by a connector and/or fastener 1008 may flow toward bulkhead 134 and may be channeled to one or more collection areas, for example a trough 156, by bulkhead 134. In examples, one or more connectors or fasteners 1008 may be implemented in addition to and/or in combination with sealing system 102 as described herein, including sealing members 1002.

In examples, bulkhead 134 may be configured to channel fluids and/or other waste material from speaker tray 1000 to trough 156 located proximate to, adjacent to, or in contact with floor 108. In examples, fluid and/or other waste material spilled over speaker tray 1000 may be collected by one or more speaker tray sealing members 1002, one or more fasteners 1008, or any combination of both. In examples, bulkhead 134 may be configured to channel fluids and/or other waste material from speaker tray 1000 to floor collection area 146.

In examples, bulkhead 134 may be configured to channel fluids and/or other waste material spilled over seat 120 and/or seating area 106 to trough 156 located proximate to, adjacent to, or in contact with floor 108. In examples, a seat 120 may include one or more channels or gaps to allow for flow of fluid and/or waste material to bulkhead 134 for collection in one or more trough 156 and/or floor collection area 146. In examples, bulkhead 134 may be configured to channel fluids and/or other waste material from seat 120 and/or seating area 106 to floor collection area 146. In examples, bulkhead 134 may be configured to channel fluids and/or other waste material from seat 120 and/or seating area 106, speaker tray 1000, or both to trough 156 located proximate to, adjacent to, or in contact with floor 108, to floor collection area 146, or both.

Figure 12A:
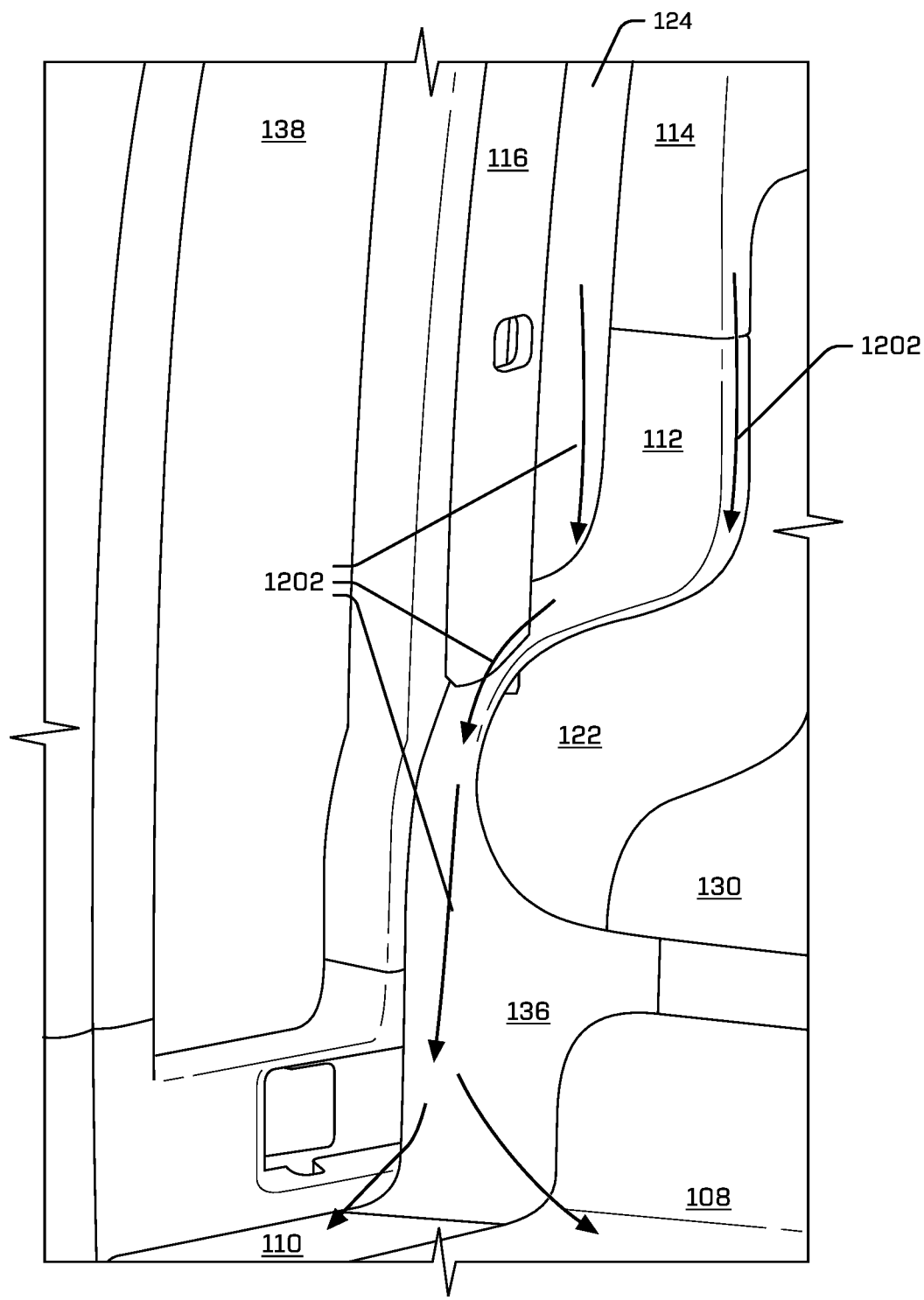
FIGS. 12A and 12B illustrate examples of flow paths that a fluid and/or waste material may follow to one or more collection areas by way of a sealing system as described and/or by way of a bulkhead.
Figure 12B:
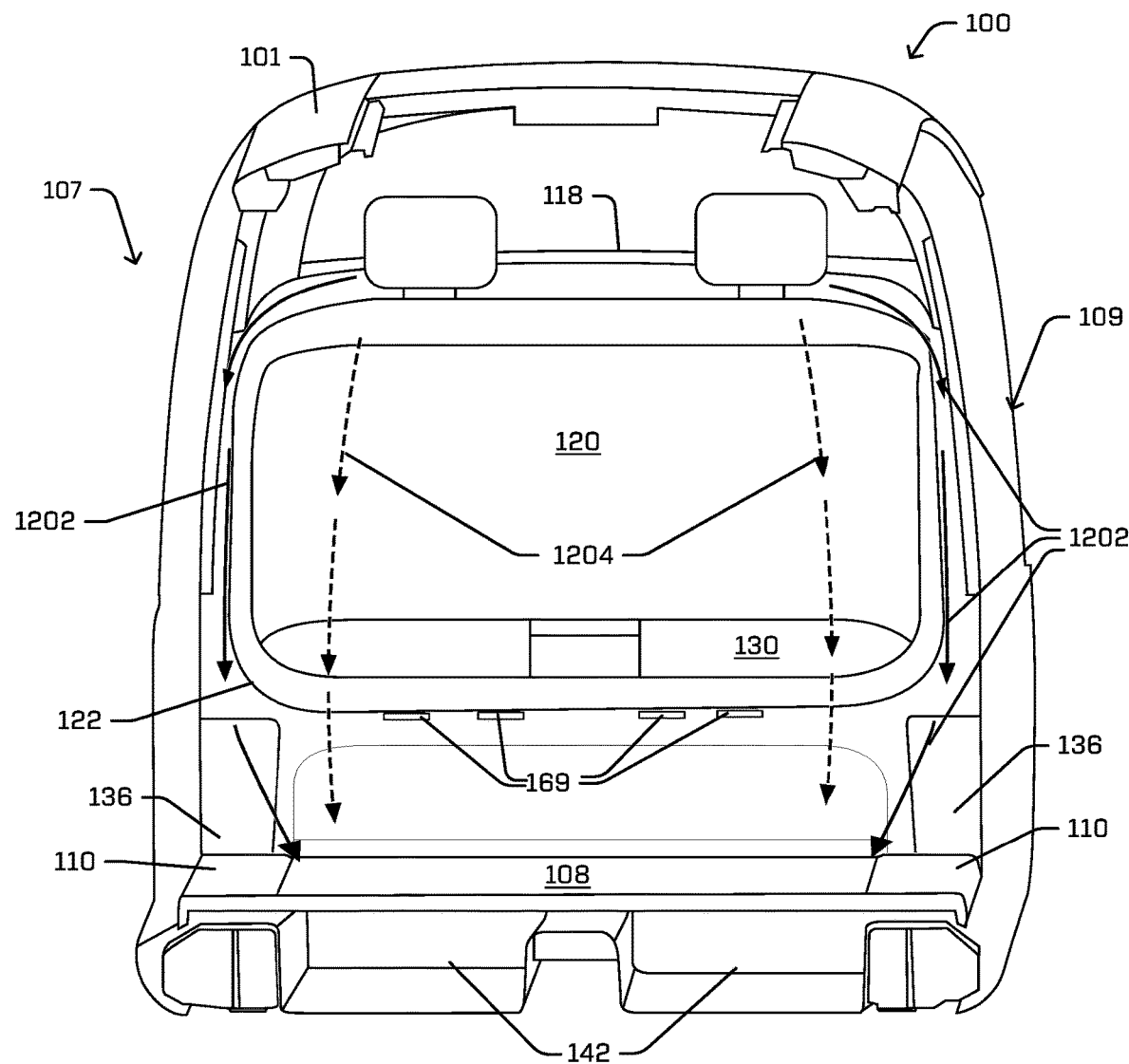

FIGS. 12A and 12B illustrate examples of flow paths along which sealing system 102 and bulkhead 134 may channel fluid and/or other waste material to a floor collection area 146, trough 156, or both. Illustrated in FIGS. 12A and 12B is only one side of one seat 120 and/or seating area 106 for ease of reference. In examples, the same path illustrated in these figures may be provided in either or both sides of a seat 120 and/or seating area 106, and for any one or more seats or seating areas provided in vehicle 100. A common collection area or common floor collection area may be provided to collect fluid and/or other waste material from all sealing systems 102 within vehicle 100 along any one or more sides of any one or more seats or seating areas. Also, one or more bulkheads 134 associated with any one or more seats 120 provide in vehicle 100 may be configured to channel fluid and/or other waste material as illustrated to collection in one or more troughs 156.

As illustrated in FIG. 12A, sealing system 102 may be configured to channel fluid and/or other waste material along seat side portion 122. In examples, sealing system 102 is configured to collect fluid and/or waste material spilled at window 124, between window 124 and seat 120, on speaker tray 118, or any combination thereof and channel at least a portion of the spilled fluid and/or waste material along at least a portion of seat side portion 122, for example along a portion of outer seat side surface 902 toward floor 108. In examples, fluid and/or waste material may be channeled to floor collection area 146, trough 156, or a combination of both. In examples, fluid and/or waste material spilled over bulkhead 134 may be collected and channeled toward floor 108 via bulkhead 134. In examples, bulkhead 134 may channel at least a portion of spilled fluid and/or waste material toward floor collection area 146, trough 156, or a combination of both. In examples, as shown in FIG. 12B, sealing system 102 and bulkhead 134 may work together to channel fluid and/or waste material toward floor collection area 146, trough 156, or a combination of both. As illustrated, in examples, sealing system 102 may channel spilled fluid and/or waste material along sealing system path 1202. In examples, sealing system path 1202 may be along a surface of sealing system 102. As illustrated, sealing system path 1202 may be on either or both sides of seat 120 and/or seating area 106. As illustrated, in examples, bulkhead 134 may channel spilled fluid and/or waste material along one or more bulkhead paths 1204. In examples, a bulkhead path 1204 may be along a surface of bulkhead 134. In examples, bulkhead path 1204 may be located behind seat 120. In examples, a bulkhead path 1204 may be located between at least a portion of bulkhead 134 and seat 120. In examples, a bulkhead path 1204 may channel a portion of a fluid and/or waste material that is not captured by sealing system 102, collected by a fastener 1008 of speaker tray 1000, spilled over seating area 106, or any combination thereof.

In examples, one or more seats 120 of seating area 106 may include impermeable material. In examples, one or more seats 120 may include material that allows for flow of fluid and/or waste material toward sealing system 102, bulkhead 134, or a combination thereof. In examples, seat 120 may be configured to promote transit of any spilled fluid and/or waste material over seat 120 toward floor 108, trough 156, and/or floor collection area 146. In examples, seat bottom 130 may be inclined toward floor 108 to promote transit of any spilled fluid and/or waste material over seat 120 toward floor 108, trough 156, and/or floor collection area 146. In examples, seat 120 include an impermeable material and be configured to promote transit of spilled fluid and/or waste material toward sealing system 102, bulkhead 134, floor 108, trough 156, floor collection area 146, or any combination thereof.

In examples, any fluid collected in trough 156, floor 108, and/or floor collection area 146 may be cleaned automatically, as described below, or manually. In examples, trough 156, floor 108, and/or floor collection area 146 may be reached and clean without requiring removal of cumbersome structures such as seats or other like components.

In examples, vehicle 100 may include one or more detection means or detectors 168 to determine that a fluid and/or other waste material has been collected on floor 108, floor collection area 146, trough 156, or any combination thereof. In examples, vehicle 100 may include one or more detection means or detectors 168 to determine that fluid and/or other waste material is present in vehicle 100 that should be channeled to a collection area and/or expelled from the vehicle. Detection may be performed visually or optically, electrically, or any combination thereof. In examples, detection may be performed by a rider, a vehicle service crew member, and/or using one or more sensors. In examples, a rider may be able to send a notification of a detected spill. In examples, notification by a rider may be submitted along with a ride rating application. In the event of a notification by a rider, the vehicle may be scheduled for service and/or temporarily taken off circulation. In examples, one or more detection means may include visual or optical detectors or sensors. In examples, one or more detection means or detectors can include one or more cameras. In examples, cameras can include color cameras, infrared cameras, or complementary metal-oxide-semiconductor (CMOS) image sensors, charge couple device (CCD) image sensors, or any combination of one or more thereof. In examples, one or more detection means or detectors may include sensors that can detect fluid presence. For example, sensors can include moisture sensor, electrical water sensors, resistive sensors, or like sensors. In examples, the one or more detection means or detectors can include one or more visual sensors and one or more sensors that can detect fluid presence. In examples, vehicle 100 may include a central computing system in communication with one or more detection means. In examples, upon detection of fluid and/or waste material in one or more locations in vehicle 100 including floor 108, floor collection area 146, trough 156, or any combination thereof, the vehicle central computing system may be configured to produce an alert or alert. In examples, an alert or alert can be message on a display screen, a light signal, an acoustic signal, or any combination thereof.

Figure 13:
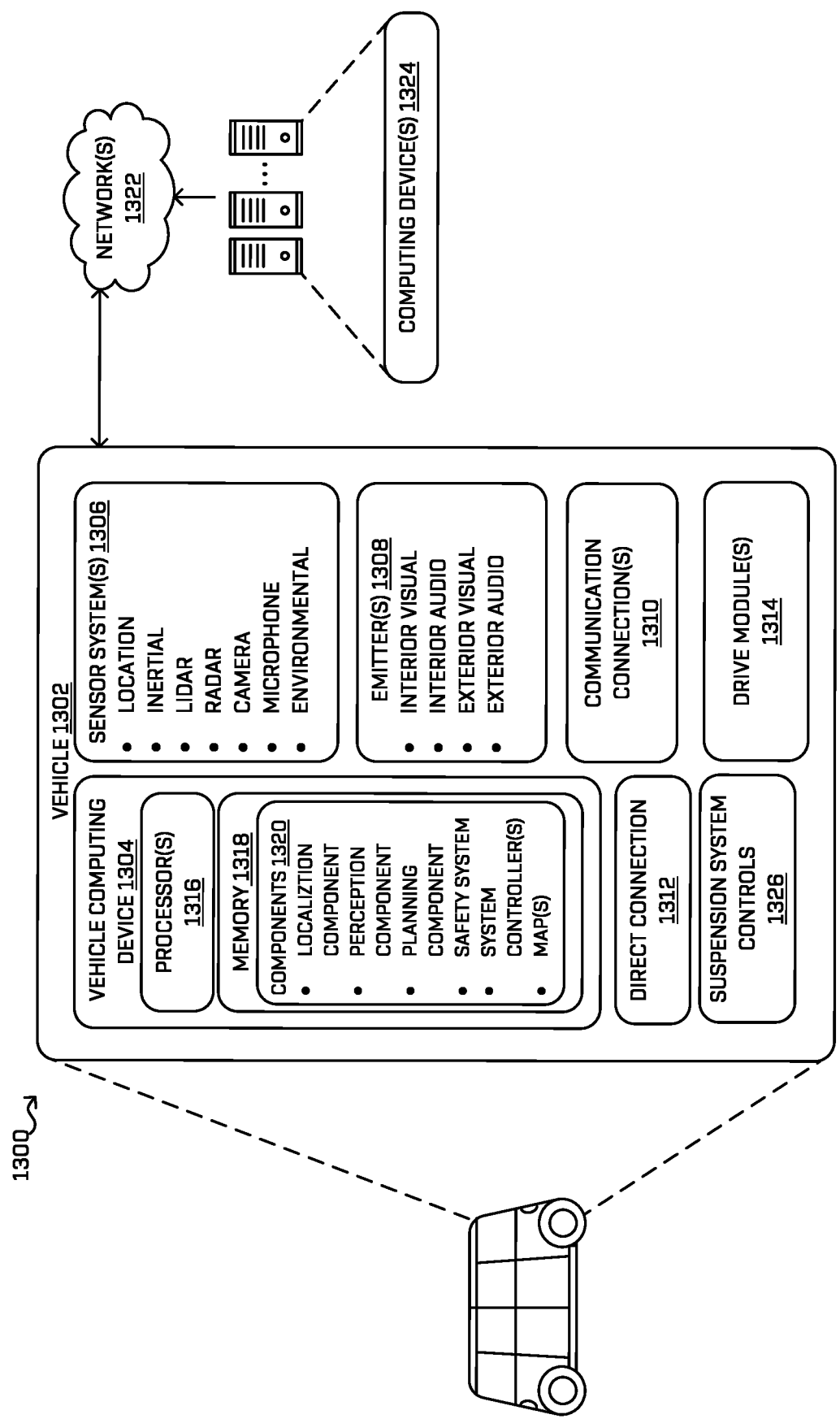
FIG. 13 is a block diagram of an example system architecture for implementing the example techniques described herein.

FIG. 13 depicts a block diagram of an example vehicle system 1300 for implementing the techniques described herein. In at least some examples, the system 1300 may include a vehicle 1302, which may correspond to the example vehicle 100 shown in FIG. 1. The vehicle 1302 may include a vehicle computing device 1304, one or more sensor system(s) 1306, one or more emitters 1308, one or more communication connections 1310, at least one direct connection 1312, one or more drive modules 1314, and one or more suspension system controls 1326.

The vehicle computing device 1304 may include one or more processors 1316 and memory 1318 communicatively coupled with the one or more processors 1316. In the illustrated example, the vehicle 1302 is an autonomous vehicle. However, the vehicle 1302 may be any other type of vehicle. In the illustrated example, the memory 1318 of the vehicle computing device 1304 stores one or more components 1320 that may be used for vehicle operation such as a localization component, a perception component, a planning component, a safety system, one or more system controllers, one or more map(s), and the like. Example descriptions of one or more components 1320, at least one direct connection 1312, and one or more drive modules 1314 may be found for example in U.S. Patent Application Publication No. 2021-0122270 and co-pending U.S. patent application Ser. No. 16/370,637, both of which are incorporated herein by reference. A suspension system control 1326 may include a controller and instructions to monitor and actuate one or more components of a suspension mechanism at one or more wheels of vehicle 100. In examples, suspension system control 1326 may include one or more logic routines to cause a suspension mechanism to vibrate, shake, and/or tilt vehicle 100.

In examples, one or more sensor system(s) 1306 may include Light Detection and Ranging (LIDAR) sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., RGB, infrared (IR), intensity, depth, time-of-flight (TOF), etc.), microphones, wheel encoders, environment sensors (e.g., temperature sensors, humidity sensors, moisture sensors, electrical water sensors, light sensors, pressure sensors, etc.), etc. The sensor system(s) 1306 may include multiple examples of each of these or other types of sensors. For example, the LIDAR sensors may include individual LIDAR sensors located at the corners, front, back, sides, and/or top of the vehicle 1302. As another example, the camera sensors may include multiple cameras disposed at various locations about the exterior and/or interior of the vehicle 1302. The sensor system(s) 1306 may provide input to the vehicle computing device 1304. Additionally, or alternatively, the sensor system(s) 1306 may send sensor data, via the one or more networks 1322, to the one or more computing device(s) 1324 at a particular frequency, after a lapse of a predetermined period of time, in near real-time, etc In examples, one or more sensor system(s) 1306 may be configured to monitor floor 108, floor collection area 146, trough 156, or any combination thereof. In examples, one or more sensors system(s) 1306 may include at least one or more cameras, moisture sensors, electrical water sensors, humidity sensors or any combination thereof for monitoring floor 108, floor collection area 146, trough 156, or any combination thereof. In examples, the one or more sensors system(s) 1306 may provide input to the vehicle computing device 1304. In examples, the one or more sensor system(s) 1306 may detect the presence of fluid and/or waste material and in response to the detection send a signal to vehicle computing device 1304. Alternatively, one or more sensor system(s) 1306 may simply sense information and send the sensor data to vehicle computing device 1304 for processing. The sensor data may be automatically processed to determine whether fluid and/or waste material is present at the monitored locations.

In examples, when vehicle system 1300 determines that fluid and/or waste material is present at the monitored locations, then vehicle system 1300 may output an alert signal. The alert signal may be visual, acoustic, or a combination thereof. In examples, the alert signal may be output via one or more emitters 1308. The emitters 1308 in this example include interior audio and visual emitters to communicate with passengers of the vehicle 1302. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 1308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology. In examples, the alert signal may include a message on an external display, an acoustic signal from a speaker, and/or a light signal from one or more LEDs or other light sources. In examples, the alert signal may alert a user that servicing of the monitored areas is required. The alert signal may be provided on vehicle 1302 and/or to a remote location using one or more communication connection(s) 1310.

In examples, in addition to or in place of an alert signal, vehicle system 1300 may trigger a self-cleaning process at the monitored areas. In examples, a self-cleaning process may include one or more of draining via one or more automatic valves, self-washing, drying, vacuuming or any combination thereof via one or more sprayer, pressurized air, dryer, and/or vacuum that may be provided in vehicle 1300 at one or more of the monitored areas and/or in a manner that they may reach one or more of the monitored areas. In examples, one or more valves can remain open thus any fluid and/or waste material channeled to a collection area can be discharged from the vehicle right away without awaiting servicing. In examples, upon detection of fluid and/or waste material in a collection area, the vehicle system 1300 may cause a door or valve of vehicle 100 to open to assist in the cleaning and/or discharging of the collected fluid and/or waste material. In examples, a panel, door, or valve can be electromechanically or otherwise opened by a vehicle to allow fluid to discharge from the vehicle when, for example, the vehicle is unoccupied. This may avoid an open door/valve from providing a path for sound to enter the cabin which may be disturbing to occupants. In examples, a drain port, valve, or door can be hidden behind the vehicle door 138 when closed. In examples, a drain port, valve, or door can be on an underside of the vehicle 100.

In examples, pressurized air to push fluid and/or waste material toward a collection area, out of the vehicle 100, and/or to dry a fluid may be provided via one or more vents 169. The vents 169 can be provided in any suitable area of vehicle 100. In examples, one or more vents 169 may be provided below a seat 120 and/or seat bottom 130 and configured to blow air toward one or more collection areas such as a floor collection area 146 and/or a trough 156. In examples, the vent may in flow connection with a heating ventilation and air conditioning (HVAC) system of vehicle 100. Any HVAC system can be used. In examples, vehicle 100 may include an HVAC system as disclosed in co-pending application Ser. No. 16/017,424, filed on Jun. 25, 2018, which is incorporated by reference herein in its entirety. In examples, vehicle system 1300 may close one or more vents in other areas of vehicle 100 to focus the air flow only through one or more vents at locations that can promote channeling of fluid and/or waste material, and/or drying of fluid. In examples, vehicle system 1300 may determine which vents to force most air out of based on the location where fluid and/or waste material is detected in vehicle 100.

In examples, in addition to or in place of an alert signal and/or triggering a self-cleaning process, vehicle system 1300 may be configured to plan a route to a service or cleaning facility upon detection of fluid and/or other waste material at one or more collection areas. In examples, the vehicle may be an autonomous vehicle that automatically travels to a service or cleaning facility to be cleaned.

The processor(s) 1316 of the vehicle 1302 may include any suitable processor capable of executing instructions to process data and perform operations as described herein. By way of example and not limitation, the processor(s) 1316 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., field programmable gate arrays or FPGAs, etc.), and other hardware devices may also be considered processors in so far as they are configured to implement encoded instructions.

Memory 1318 may be a non-transitory computer-readable media. In examples, memory 1318 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

Vehicle 1302 may also include one or more communication connection(s) 1310 that enable communication between the vehicle 1302 and one or more other local or remote computing device(s). For example, the communication connection(s) 1310 may facilitate communication with other local computing device(s) on the vehicle 1302 and/or the drive module(s) 1314. Also, the communication connection(s) 1310 may allow the vehicle 1302 to communicate with other nearby computing device(s) (e.g., other nearby vehicles, traffic signals, etc.). The communications connection(s) 1310 also enable the vehicle 1302 to communicate with a remote teleoperations computing device or other remote services.

The communications connection(s) 1310 may include physical and/or logical interfaces for connecting the vehicle computing device 1304 to another computing device or a network, such as network(s) 1332. For example, the communications connection(s) 1310 may enable Wi-Fi-based communication, such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

Those skilled in the art will appreciate that the example architecture 1300 shown in FIG. 13 is merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architecture 1300 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Figure 14:
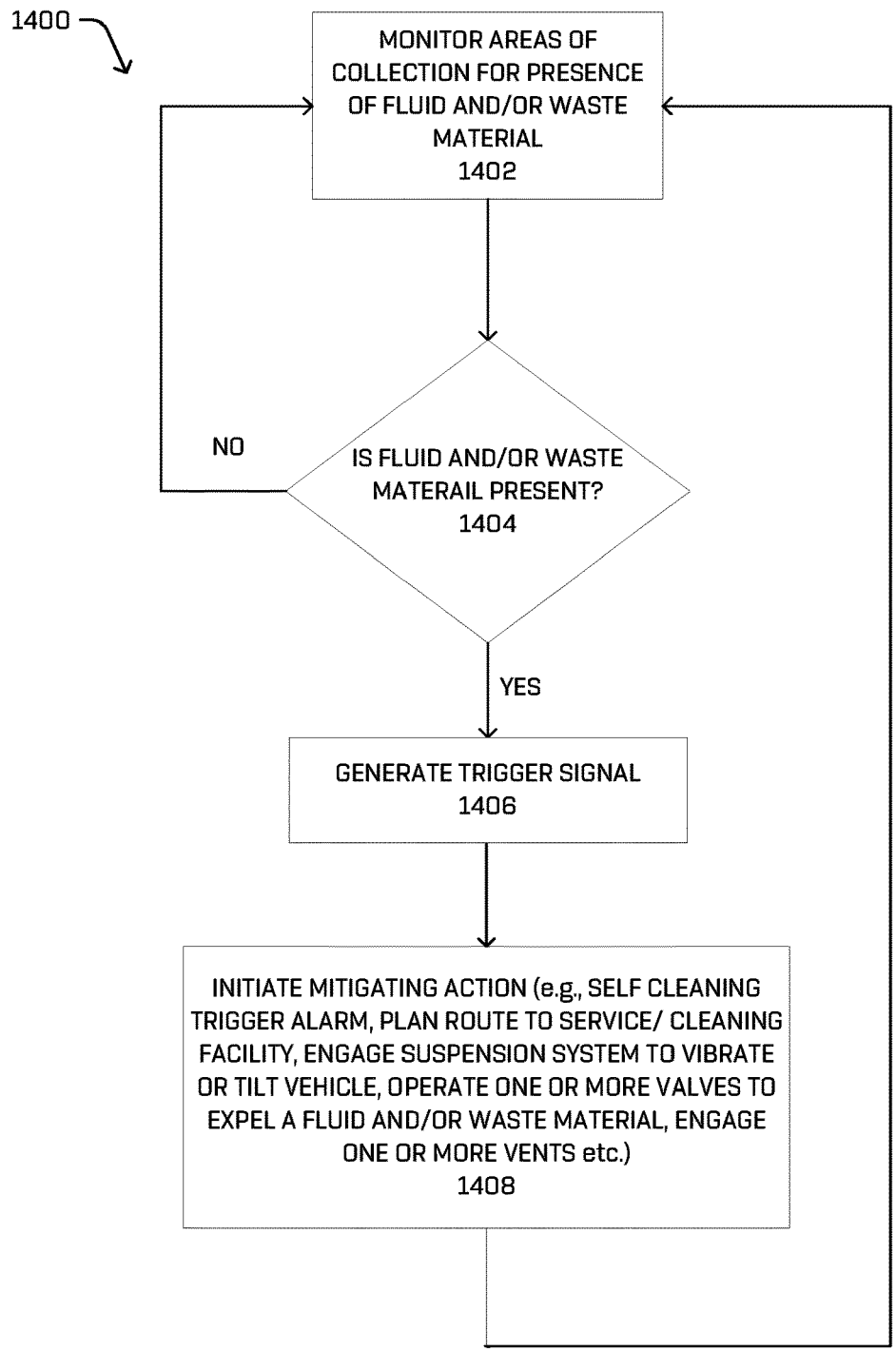
FIG. 14 is a flow diagram of an example of a detection process of collected fluid and/or waste material.

FIG. 14 illustrates an example flow chart of the operation of a detection process 1400 fluid and/or waste material on floor 108, floor collection area 146, and/or trough 156, and respective action. At 1402, vehicle system 1300 may monitor one or more areas of interest. The monitoring can be performed by one or more sensor system(s) 1306 as described earlier. The monitoring can be conducted continuously, intermittently, at intervals, or in conjunction with an event occurrence. In examples, the monitoring may be conducted every time vehicle 1302 is started. In examples, the monitoring may be conducted continuously while vehicle 1302 is on and/or in operation. In examples, the monitoring may be conducted at interval times while vehicle 1302 is on and/or in operation. At 1404 the vehicle system 1300 may determine if a fluid and/or waste material is present at a monitored area. If the vehicle system 1300 does not detect fluid and/or waste material, the system returns to the monitoring at 1402. If, instead, the vehicle system 1300 determines that fluid and/or waste material is present and/or detected, then vehicle system 1300 may generate a trigger signal at 1406. In response to generating a trigger signal at 1406 vehicle system 1300 may conduct one or both of operations 1408 and 1410. In examples where vehicle 1302 is equipped with self-cleaning equipment, in response to trigger signal at 1406, vehicle system 1300 may engage such self-cleaning equipment to remove the detected fluid and/or waste material from the detected area. In examples, vehicle system 1300 may trigger an alert in place of or in addition to engaging the self-cleaning, plan route to a service or cleaning facility, engage suspension system to vibrate or tilt vehicle, operate one or more valves to expel a fluid and/or waste material from vehicle 100, and/or engage one or more vents at 1408. As described above, an alert as triggered may include a visual and/or acoustic alert output by an internal or external emitter of the vehicle. Once the self-cleaning has been completed and/or the triggered alert has been disengaged for example by an operator or maintenance entity, and/or visit to a service or cleaning facility has been planned or performed, the system may be configured to return to monitoring at 1402. In examples, the vehicle may be configured to receive an indication of a spill based on a user input via an interface in the vehicle (e.g., touch screen, microphone, camera, etc.) and/or via a mobile device or other remote device capable of wireless communication either via radio frequency (RF), wireless network, Bluetooth or like communication means.

It should be appreciated that subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of subject matter described herein may be practiced on or in conjunction with other computer system configurations beyond those described herein, including multiprocessor systems, microprocessor-based or programmable consumer electronics, minicomputers, mainframe computers, hand-held computers, mobile telephone devices, tablet computing devices, special-purposed hardware devices, network appliances, and the like.

Although subject matter presented herein has been described in language specific to computer structural features, methodological acts, and computer readable media, it is to be understood that the subject matter defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present disclosure, which is set forth in the following claims.

Example Clauses

A. A vehicle comprising: a vehicle cabin comprising a wet area and a dry area; one or more electrical components located in the dry area; a seating area comprising a first seat and a second seat, wherein the first seat and second seat are arranged facing each other; one or more collection areas comprising a floor collection area disposed between the first seat and the second seat; and a sealing system separating the wet area from the dry area, wherein the sealing system is configured to channel a fluid or waste material in the wet area to the floor collection area and to prevent transition of the fluid or waste material from transitioning from the wet area to the dry area.

B. The vehicle of paragraph A, the sealing system comprising rubber, a hydrophobic material, foam, polyvinyl chloride, a thermoplastic vulcanizate material, or any combination thereof.

C. The vehicle of paragraph A or B, wherein the sealing system is configured to extend along at least one side of the seating area, from an upper portion of a vehicle cabin to a lower portion of the vehicle cabin.

D. The vehicle of any one of paragraphs A to C, further comprising a speaker tray located between the seating area and one end of the vehicle, wherein the sealing system extends to the speaker tray, such that fluid or waste material spilled on the speaker tray is channeled to the floor collection area.

E. The vehicle of paragraph D, wherein the speaker tray comprises a first end proximate the seating area and a second end distal from the seating area, and the speaker tray is inclined such that the second end is elevated relative to the first end.

F. The vehicle of any one of paragraphs A to E, further comprising a window, wherein the sealing system extends to the window, such that fluid or waste material spilled on the window is channeled to the floor collection area.

G. The vehicle of paragraph F, the window comprising a window trim, wherein the sealing system extends to the window trim, such that fluid or waste material spilled on the window trim is channeled to the floor collection area.

H. The vehicle of any one of paragraphs A to G, further comprising a kickplate, wherein the sealing system extends to the kickplate, such that fluid or waste material can travel to the kickplate and then to the floor collection area.

I. The vehicle of any one of paragraphs A to H, wherein the sealing system extends from a first end of the seating area to a second end of the seating area, such that fluid or waste material can travel from the first end of the seating area to the second end of the seating area.

J. The vehicle of any one of paragraphs A to I, further comprising: a bulkhead behind the seating area, wherein the one or more collection areas further comprise a trough, and wherein the bulkhead is configured to channel fluid or waste material to the trough.

K. The vehicle of any one of paragraphs A to J, further comprising a detector for detecting presence of the fluid or waste material in one or more of the one or more collection areas.

L. A sealing system in an internal portion of a vehicle having carriage style seating, the sealing system comprising: a first element extending along a seating area of the vehicle; a second element at a longitudinal end of the seating area; a third element at a window of the vehicle; and a collection area located at a floor of the vehicle, wherein the first element, second element, and third element are configured to channel fluid or waste material to the collection area.

M. The sealing system of paragraph L, wherein the first element, second element, and third element are arranged to form a continuous structure.

N. The sealing system of paragraph L or M, wherein the first element, the second element, and the third element comprise a hydrophobic material.

O. The sealing system of any one of paragraphs L to N, wherein: the first element is configured to seal one or more gaps at an interface of a seat and a side portion of the vehicle; the second element is configured to seal one or more gaps at an interface of the longitudinal end of the seating area and the seat; and the third element is configured to seal one or more gaps at an interface of two or more vehicle components.

P. A method of collecting fluid or waste material inside a vehicle comprising: receiving fluid or waste material in a passenger compartment of the vehicle; channeling, using a sealing system, the fluid or waste material to a collection area located inside the vehicle; and detecting, by a detector of the vehicle, presence of the fluid or waste material in the collection area.

Q. The method of paragraph P, wherein channeling is aided by gravity, vibration, ultrasound or a combination thereof.

R. The method of paragraph P or Q, wherein the sealing system seals one or more gaps at an interface of two or more vehicle components to prevent the fluid or waste material from seeping through the one or more gaps at the interface of the two or more vehicle components.

S. The method of any one of paragraphs P to R, wherein detecting the presence of fluid or waste material comprises visually detecting or electrically sensing the fluid or waste material.

T. The method of any one of paragraphs P to S, further comprising automatically removing the fluid or waste material from the collection area.

While the example clauses described above are described with respect to particular implementations, it should be understood that, in the context of this document, the content of the example clauses can be implemented via a method, device, system, a computer-readable medium, and/or another implementation. Additionally, any of examples A to T may be implemented alone or in combination with any other one or more of the examples A to T.

What is claimed is:

1. A vehicle comprising:
a vehicle cabin comprising a wet area and a dry area;
one or more electrical components located in the dry area;
a seating area comprising a first seat and a second seat, wherein the first seat and second seat are arranged facing each other;
one or more collection areas comprising a floor collection area disposed between the first seat and the second seat; and
a sealing system separating the wet area from the dry area, wherein the sealing system is configured to channel a fluid or waste material in the wet area to the floor collection area and to prevent transition of the fluid or waste material from transitioning from the wet area to the dry area.

2. The vehicle of claim 1, the sealing system comprising rubber, a hydrophobic material, foam, polyvinyl chloride, a thermoplastic vulcanizate material, or any combination thereof.

3. The vehicle of claim 1, wherein the sealing system is configured to extend along at least one side of the seating area, from an upper portion of a vehicle cabin to a lower portion of the vehicle cabin.

4. The vehicle of claim 1, further comprising a speaker tray located between the seating area and one end of the vehicle, wherein the sealing system extends to the speaker tray, such that fluid or waste material spilled on the speaker tray is channeled to the floor collection area.

5. The vehicle of claim 4, wherein the speaker tray comprises a first end proximate the seating area and a second end distal from the seating area, and the speaker tray is inclined such that the second end is elevated relative to the first end.

6. The vehicle of claim 1, further comprising a window, wherein the sealing system extends to the window, such that fluid or waste material spilled on the window is channeled to the floor collection area.

7. The vehicle of claim 6, the window comprising a window trim, wherein the sealing system extends to the window trim, such that fluid or waste material spilled on the window trim is channeled to the floor collection area.

8. The vehicle of claim 1, further comprising a kickplate, wherein the sealing system extends to the kickplate, such that fluid or waste material can travel to the kickplate and then to the floor collection area.

9. The vehicle of claim 1, wherein the sealing system extends from a first end of the seating area to a second end of the seating area, such that fluid or waste material can travel from the first end of the seating area to the second end of the seating area.

10. The vehicle of claim 1, further comprising:
a bulkhead behind the seating area,
wherein the one or more collection areas further comprise a trough, and
wherein the bulkhead is configured to channel fluid or waste material to the trough.

11. The vehicle of claim 1, further comprising a detector for detecting presence of the fluid or waste material in one or more of the one or more collection areas.

12. A sealing system in an internal portion of a vehicle having carriage style seating, the sealing system comprising:
a first element extending along a seating area of the vehicle;
a second element at a longitudinal end of the seating area;
a third element at a window of the vehicle; and
a collection area located at a floor of the vehicle,
wherein the first element, second element, and third element are configured to channel fluid or waste material to the collection area.

13. The sealing system of claim 12, wherein the first element, second element, and third element are arranged to form a continuous structure.

14. The sealing system of claim 12, wherein the first element, the second element, and the third element comprise a hydrophobic material.

15. The sealing system of claim 12, wherein:
the first element is configured to seal one or more gaps at an interface of a seat and a side portion of the vehicle;
the second element is configured to seal one or more gaps at an interface of the longitudinal end of the seating area and the seat; and
the third element is configured to seal one or more gaps at an interface of two or more vehicle components.

16. A method of collecting fluid or waste material inside a vehicle comprising:
receiving fluid or waste material in a passenger compartment of the vehicle;
channeling, using a sealing system, the fluid or waste material to a collection area located inside the vehicle; and
detecting, by a detector of the vehicle, presence of the fluid or waste material in the collection area.

17. The method of claim 16, wherein channeling is aided by gravity, vibration, ultrasound or a combination thereof.

18. The method of claim 16, wherein the sealing system seals one or more gaps at an interface of two or more vehicle components to prevent the fluid or waste material from seeping through the one or more gaps at the interface of the two or more vehicle components.

19. The method of claim 16, wherein detecting the presence of fluid or waste material comprises visually detecting or electrically sensing the fluid or waste material.

20. The method of claim 16, further comprising automatically removing the fluid or waste material from the collection area.

* * * * *